US012538291B2

(12) United States Patent
Xia et al.

(10) Patent No.: US 12,538,291 B2
(45) Date of Patent: Jan. 27, 2026

(54) NON-R-TWT MEMBER STA ACCESS GRANT FOR BURST TRAFFIC TRANSMISSION

(71) Applicants: SONY GROUP CORPORATION, Tokyo (JP); SONY CORPORATION OF AMERICA, New York, NY (US)

(72) Inventors: Qing Xia, San Jose, CA (US); Mohamed Abouelseoud, Burlingame, CA (US); Li-Hsiang Sun, San Jose, CA (US); Liangxiao Xin, Santa Clara, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 498 days.

(21) Appl. No.: 18/052,664

(22) Filed: Nov. 4, 2022

(65) Prior Publication Data

US 2023/0156687 A1 May 18, 2023

Related U.S. Application Data

(60) Provisional application No. 63/264,127, filed on Nov. 16, 2021.

(51) Int. Cl.
*H04W 72/121* (2023.01)
*H04W 74/0816* (2024.01)

(52) U.S. Cl.
CPC ..... *H04W 72/121* (2013.01); *H04W 74/0816* (2013.01)

(58) Field of Classification Search
None
See application file for complete search history.

(56) References Cited

U.S. PATENT DOCUMENTS

2016/0219512 A1 7/2016 Asterjadhi
2021/0022154 A1 1/2021 Cavalcanti
2021/0352722 A1* 11/2021 Xin .......................... H04L 1/08

FOREIGN PATENT DOCUMENTS

JP 2018505608 A 2/2018
JP 2020534728 A 11/2020
WO WO-2019010400 A1 * 1/2019 ............ H04W 48/10

OTHER PUBLICATIONS

"35. Extremely high throughput (EHT) MAC specification 35.1 Introduction", IEEE Draft; TGBE_CL_35, IEEE-SA, Piscataway, NJ USA, vol. 802.11 be drafts, No. D1 .2 Sep. 23, 2021 (Sep. 23, 2021), pp. 1-96, XP068185764 (Year: 2021).*

(Continued)

*Primary Examiner* — Joseph A Bednash
(74) *Attorney, Agent, or Firm* — O'BANION & RITCHEY LLP; John P. O'Banion

(57) ABSTRACT

A non-AP STA, which is a scheduled STA having membership in an R-TWT scheduled STA, having an enqueued urgent burst of RTA traffic for the AP during an ongoing R-TWT SP of which it does not have R-TWT membership, is enabled to initiate R-TWT negotiation with the scheduling AP inside the ongoing R-TWT SP to either request a temporary or a long-term membership of the current ongoing R-TWT SP or request to setup a new temporary or long-term R-TWT SP after the current SP, but before the SP it originally had membership in, or to contend for an RA-RU in the current R-TWT SP if UORA feature is enabled. Thus, a non-R-TWT member STA is granted access for its burst traffic transmissions.

21 Claims, 31 Drawing Sheets

(56) References Cited

OTHER PUBLICATIONS

Hu et al. "Traffic Prioritization During the Restricted TWT SPs", IEEE 802.11-21/1115r0 2021-02-25 (Year: 2021).*
Ding et al. "Enhanced UORA", IIIE 802.11-21/0400r1, Mar. 12, 2021 (Year: 2021).*
Kedem et al. "UORA Enhancements to address RTA", IEEE 802.11-20, 1902/r0, Dec. 2020 (Year: 2020).*
Chunya Hu (Facebook), "CC36-CR-35.6 Traffic Prioritization During Restricted TWT SPs", IEEE 802.11-21/1115r1, IEEE, Sep. 16, 2021, 15 pgs., PGS.Internet < URL:https://mentor.ieee.org/802.11/dcn/21/11-21-1115-01-00be-cc36-cr-35-6-traffic-prioritization-during-restricted-twt-sps.pptx >.
Meta, "p2p Support in Restricted TWT: Use Cases and Signaling Design Discussion", IEEE 802.11-21/1855r0 , IEEE, 10 pgs., Internet<URL:https://mentor.ieee.org/802.11/den/21/11-21-1855-00-00be-p2p-support-in-restricted-twt-use-cases-and-signaling-design-discussion.pptx>.
Thomas Handte (Sony), "Primary and Secondary User in R-TWT", IEEE 802.11-21/1656r0, IEEE, Oct. 8, 2021, 16 pgs., Internet<URL:https://mentor.ieee.org/802.11/den/21/11-21-1656-00-00be-primary-and-secondary-user-in-r-twt.pptx>.
IEEE, "35. Extremely high throughput (EHT) MAC specification 35.1 Introduction", IEEE Draft; TGBE_CL_35, IEEE-SA, Piscataway, NJ USA vol. 802.11be drafts, No. D1.2, Sep. 23, 2021 (Sep. 23, 2021), pp. 315-410, XP068185764.

* cited by examiner

TWT Element

| Element ID | Length | Control | TWT parameter Information |
|---|---|---|---|

FIG. 1
(Prior Art)

Control Subfield

| B0 | B1 | B2 B3 | B4 | B5 | B6 | B7 |
|---|---|---|---|---|---|---|
| NDP Paging Indicator | Responder PM Mode | Negotiation Type | TWT Information Frame Disabled | Wake Duration Unit | Link ID Bitmap Present | Reserved |
| 1 | 1 | 2 | 1 | 1 | 1 | 1 |

Bits:

FIG. 2
(Prior Art)

Broadcast TWT Parameter Set Field

| Request Type | Target Wake Time | Nominal Minimum TWT Wake Duration | TWT Wake Interval Mantissa | Broadcast TWT Info | Restricted TWT Traffic Info (optional) |
|---|---|---|---|---|---|
| 2 | 2 | 1 | 2 | 2 | 0 or 3 |

Octets:

FIG. 3
(Prior Art)

Request Type Field

| B0 | B1 B2 B3 | B4 | B5 | B6 | B7 B8 B9 | B10 B11 B12 B13 B14 | B15 |
|---|---|---|---|---|---|---|---|
| TWT Request | TWT Setup Command | Trigger | Last Broadcast Parameter Set | Flow Type | Broadcast TWT Recommendation | TWT Wake Interval Exponent | Reserved |
| Bits: 1 | 3 | 1 | 1 | 1 | 3 | 5 | 1 |

FIG. 4
(Prior Art)

Broadcast TWT Info

| B0 | B1 | B2 | B3 B4 B5 B6 B7 | B8 B9 B10 B11 B12 B13 B14 B15 |
|---|---|---|---|---|
| Restricted TWT Traffic Info Present | Restricted TWT Schedule Full | Reserved | Broadcast TWT ID | Broadcast TWT Persistence |
| Bits: 1 | 1 | 1 | 5 | 8 |

FIG. 5
(Prior Art)

Restricted TWT Info

| Traffic Info Control | Restricted TWT DL TID Bitmap | Restricted TWT UL TID Bitmap |
|---|---|---|
| Octets: 1 | 1 | 1 |

FIG. 6
(Prior Art)

Traffic Info Control

| DL TID Bitmap Valid | UL TID Bitmap Valid | Reserved |
|---|---|---|
| B0 | B1 | B2 – B7 |
| 1 | 1 | 6 |

Bits:

**FIG. 7
(Prior Art)**

TWT Info

| TWT Flow Identifier | Response Requested | Next TWT Request | Next TWT Subfield Size | All TWT | Next TWT |
|---|---|---|---|---|---|
| B0 – B2 | B3 | B4 | B5 – B6 | B7 | B8 – Bn |
| 3 | 1 | 1 | 2 | 1 | 0, 32, 48, or 64 |

Bits:

**FIG. 8
(Prior Art)**

Temp. Member Subfield in Request Type Field in Broadcast TWT Parameter Set Field for R-TWT

| TWT Request | TWT Setup Command | Trigger | Last Broadcast Parameter Set | Flow Type | Broadcast TWT Recommendation | TWT Wake Interval Exponent | Temporary Member |
|---|---|---|---|---|---|---|---|

FIG. 25

R-TWT Info w/temp. Member Subfield for R-TWT

| TWT Flow Identifier | Response Requested | Next TWT Request | Next TWT Subfield Size | All TWT | Next TWT | Temporary R-TWT | Traffic Info Control |
|---|---|---|---|---|---|---|---|

| Restricted TWT DL TID Bitmap | Restricted TWT UL TID Bitmap |
|---|---|

FIG. 26

NON-R-TWT MEMBER STA ACCESS GRANT FOR BURST TRAFFIC TRANSMISSION

CROSS-REFERENCE TO RELATED APPLICATIONS

This application claims priority to, and the benefit of, U.S. provisional patent application Ser. No. 63/264,127 filed on Nov. 16, 2021, incorporated herein by reference in its entirety.

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to wireless network communications under CSMA/CA, and more particularly to increasing real-time packet traffic when using R-TWT SPs.

2. Background Discussion

Current wireless technologies using CSMA/CA focus on high throughput network performance. However, an increasing number of applications, such as Real-Time Applications (RTA), require low latency communications. The data generated from the RTA is called RTA traffic and is packetized as RTA frames at the transmitter STA. Also, the data generated from the non-time sensitive application is called non-RTA traffic and will be packetized as non-RTA frame at the transmitter STA. Then, the transmitter STA transmits packets carrying frames to the receiver STA over the channel.

The RTA frame requires low latency communication due to its high timeliness delivery requirements. The RTA frame is generally only valid if it is delivered within a specific period of time.

One intended solution under CSMA/CA is to schedule a service period (SP) of a Restricted Target Wake Time (R-TWT), as defined in 802.11be, for the RTA frame exchange. The R-TWT SP grants higher priority to scheduled RTA frames, however unscheduled RTA frames may suffer significant delay, even if the information being transmitted is of high importance.

Accordingly, a need exists for improved processing of R-TWT SPs. The present disclosure overcomes that issue and provides additional benefits.

BRIEF SUMMARY

A non-AP STA, which is an R-TWT scheduled STA, has enqueued an urgent burst of RTA traffic for the AP during an ongoing R-TWT SP, of which the scheduled STA does not have an R-TWT membership. Under the present disclosure a non-AP STA can initiate R-TWT negotiations with the scheduling AP inside the ongoing R-TWT SP to either request temporary or long-term membership of the current ongoing R-TWT SP or request to setup a new temporary or long-term R-TWT SP after the current one but before the one it originally had R-TWT membership in, or contend for an RA-RU in the current R-TWT SP if the UORA feature is enabled.

Further aspects of the technology described herein will be brought out in the following portions of the specification, wherein the detailed description is for the purpose of fully disclosing preferred embodiments of the technology without placing limitations thereon.

BRIEF DESCRIPTION OF THE DRAWINGS

The technology described herein will be more fully understood by reference to the following drawings which are for illustrative purposes only:

FIG. 1 is a data field diagram of a TWT element.

FIG. 2 is a data field diagram of control field of the TWT element of FIG. 1.

FIG. 3 is a data field diagram of a broadcast TWT parameter set.

FIG. 4 is a data field diagram of a request type field in the broadcast TWT parameter set field.

FIG. 5 is a data field diagram of a broadcast TWT information subfield in TWT parameter set field.

FIG. 6 is a data field diagram of a restricted TWT traffic information field.

FIG. 7 is a data field diagram of a Traffic Info Control field of the Restricted TWT Traffic information field.

FIG. 8 is a data field diagram of the frame format of the TWT information field.

FIG. 25 is a data field diagram of a Temporary Member subfield in a Request Type field in the Broadcast TWT parameter Set field for R-TWT, according to at least one embodiment of the present disclosure.

FIG. 26 is a data field diagram of an R-TWT Information frame format with a Temporary Member subfield for R-TWT, according to at least one embodiment of the present disclosure.

DETAILED DESCRIPTION

1. Introduction to R-TWT Operation

Figure 9:
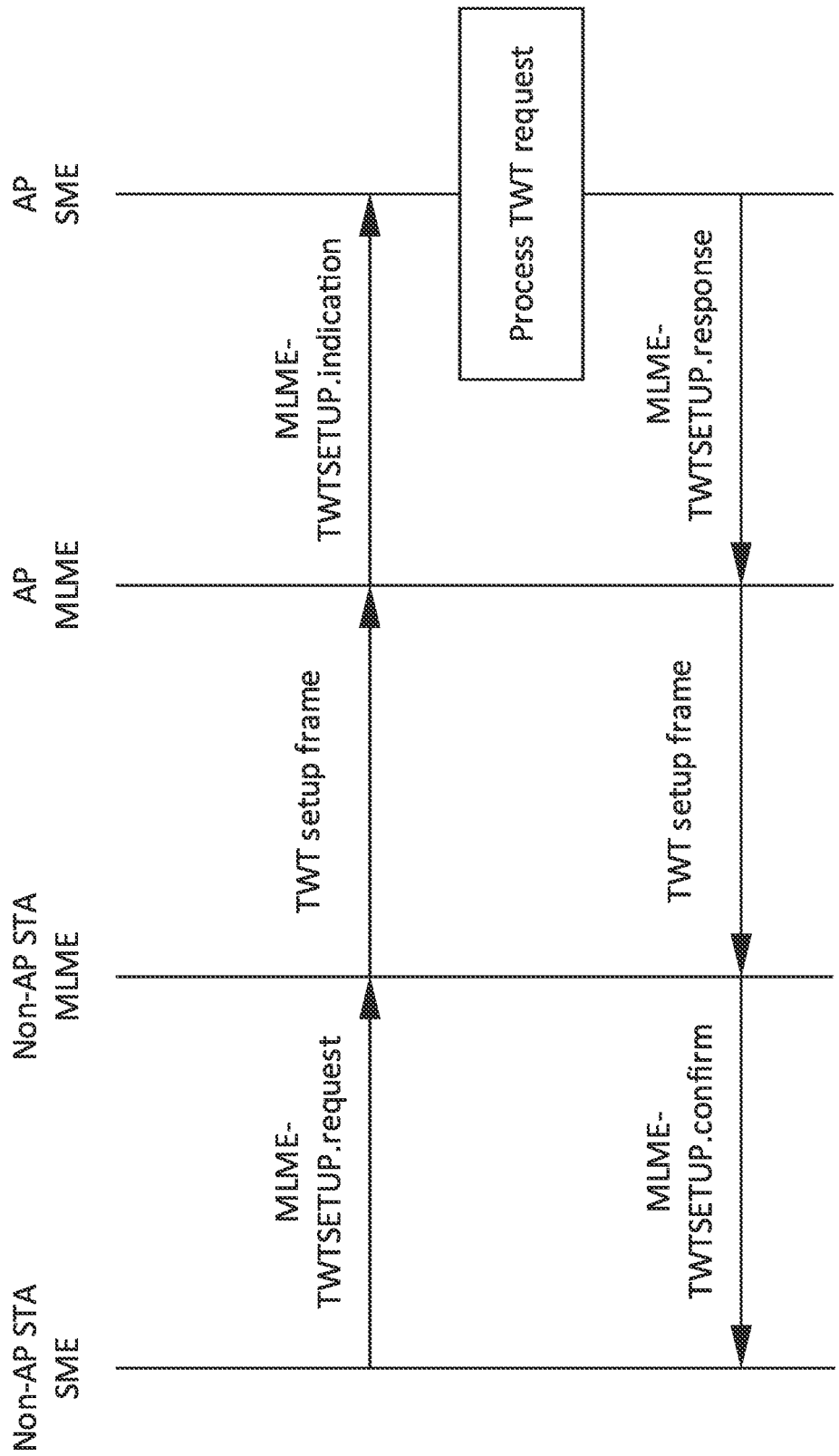
FIG. 9 is an interworking communications diagram of a TWT setup frame defined in IEEE 802.11ax.

A non-Access Point (non-AP) Extra High Throughput (EHT) STA establishes membership for one or more Restricted Target Wake Time (R-TWT) schedules with its associated EHT AP through association (or reassociation) TWT setup frame exchange.

The R-TWT SP is scheduled for completing the transmission to, or from, a group of non-AP STAs which are the R-TWT members of this SP. A non-AP EHT STA Transmit Opportunity (TXOP) holder that agrees to the R-TWT schedule, but that is not a member of a R-TWT SP, should transmit within the R-TWT SP, which was scheduled for itself.

The non-AP EHT STA that doesn't have membership in a R-TWT SP should still be able to access the R-TWT SP spontaneously, but it may not have the same priority given to R-TWT SP member STAs, especially when the transmission is initiated/triggered by the R-TWT scheduling AP.

A burst of RTA traffic from an application may be generated at any time and this RTA traffic requests to be sent out as soon as possible. However, burst RTA traffic may suffer delay under the R-TWT scheduling if a non-AP EHT STA doesn't have membership in the current R-TWT SP, but still needs to deliver this burst RTA traffic.

1.1. Elements in IEEE 802.11

1.1.1. TWT Element

FIG. 1 depicts the format of a TWT element defined in IEEE 802.11be, showing an Element Identification (ID) field, Length field, Control field, TWT Parameter Information.

FIG. 2 depicts the control field of the TWT element of FIG. 1. The subfields of the control field are as follows. An NDP Paging Indicator is set to a value of 1 to indicate NDP paging is to be performed; otherwise, the NDP Paging field is set to 0. The Responder PM Mode subfield indicates the power management mode. The Negotiation Type subfield indicates whether the information included in the TWT element is for the negotiations of a broadcast TWT (B-TWT) or individual TWT (I-TWT) or a Wake TBTT interval. It will be noted that the MSB of the Negotiation Type subfield is the B-TWT. The TWT Information Frame Disabled subfield is set to 1 to indicate that the reception of the TWT Information frames is disabled by the STA; otherwise, it is set to 0. The Wake Duration Unit subfield indicates the units of the Nominal Minimum TWT Wake Duration field. The Wake Duration Unit Subfield is set to 0 if the unit is 265 us and is set to 1 if the unit is a TU. The Link ID Bitmap field is present if the Link ID Bitmap Present field is equal to 1; otherwise, the Link ID Bitmap field is not present.

FIG. 3 depicts the Broadcast TWT parameter Set field format. One or more broadcast TWT parameter sets are contained in the TWT element if the Broadcast field of the Negotiation Type subfield is 2 or 3. The Request Type subfield of the Broadcast TWT parameter Set field is shown in FIG. 4. The Target Wake Time field contains an unsigned integer corresponding to a TSF time at which the STA requests to wake. It should be noted that if transmitted by a TWT requesting STA, or a TWT scheduled STA, and the TWT Setup Command subfield contains the value corresponding to the command "Request TWT", then the Target Wake Time field contains the value 0.

The Nominal Minimum TWT Wake Duration field indicates the minimum amount of time, in units indicated by the Wake Duration Unit subfield, that the TWT requesting STA or TWT scheduled STA is expected to be awake in order to complete the frame exchanges for the period of TWT wake interval. The TWT Wake Interval Mantissa subfield is set to a binary value of the mantissa of the TWT wake interval value in microseconds. The Broadcast TWT Info subfield is shown in FIG. 5. The Restricted TWT Traffic Info field is presented when the Restricted TWT Traffic Info Present subfield of the Request Type field is set to 1; and its format is defined in FIG. 6.

FIG. 4 depicts the Request type field in the Broadcast TWT parameter Set field. A STA that transmits a TWT element with the TWT Request subfield equals to 1 is a TWT requesting STA or TWT scheduled STA. Otherwise, it is a TWT responding STA or TWT scheduling AP.

The TWT Setup Command subfield values indicate the type of TWT. For example, TWT Setup Command field values are as follows: 0="Request TWT"; 1="Suggest TWT"; 2="Demand TWT", and 3="TWT Grouping"; 4="Accept TWT"; 5="Alternate TWT"; 6="Dictate TWT" and 7="Reject TWT".

The meaning of "Request TWT" is that the requesting STA does not provide a set of TWT parameters for a TWT agreement, and thus leaving the choice of parameters to the responding STA. "Suggest TWT" indicates that the requesting STA offers a set of preferred TWT parameters for a TWT agreement, yet may accept alternative TWT parameters that the responding STA indicates, and "Demand TWT" indicates that the requesting STA will currently accept only the indicated TWT parameters for a TWT agreement.

When transmitted by a responding STA a value of "Accept TWT" indicates that the responding STA has initiated a TWT agreement with the given parameters. A value of "Alternate TWT" indicates a counteroffer of the TWT parameters, although alternative TWT parameters might be accepted as well, without the creation of a TWT agreement. A value of "Dictate TWT" indicates that no TWT agreement is created, but one is likely to be accepted only if the requesting STA transmits a new TWT setup request with the indicated TWT parameters, and a value of "Reject TWT" transmitted by a responding STA as part of a negotiation for a new TWT agreement is used to indicate that the negotiation has ended and failed to create a new TWT agreement.

The Trigger field indicates whether the TWT SP indicated by the TWT element includes triggering frame. The Trigger field is set to 1 to indicate that at least one triggering frame is transmitted during the TWT SP. The Trigger field is set to 0 otherwise.

The Last Broadcast Parameter Set subfield is set to 0 to indicate that another broadcast TWT Parameter set follows this set. The Last Broadcast Parameter Set subfield is set to 1 to indicate that this is the last broadcast TWT Parameter set in the broadcast TWT element.

The Flow Type subfield indicates the type of interaction between the TWT requesting STA or TWT scheduled STA and the TWT responding STA or TWT scheduling AP at a TWT. Setting the Flow Type subfield to 0 indicates an announced TWT in which the TWT requesting STA or TWT scheduled STA will send a PS-Poll or an APSD trigger frame to signal its awake state to the TWT responding STA or TWT scheduling AP before a frame that is not a trigger frame is sent from the TWT responding STA or TWT scheduling AP to the TWT requesting STA or TWT scheduled STA. Setting the Flow Type subfield to 1 indicates an unannounced TWT in which the TWT responding STA or TWT scheduling AP will send a frame to the TWT requesting STA or TWT scheduled STA at the TWT without waiting to receive a PS-Poll or an APSD trigger frame from the TWT requesting STA or TWT scheduled STA.

A TWT SP that is setup under an announced TWT agreement is an announced TWT SP. A TWT SP that is setup under an unannounced TWT agreement is an unannounced TWT SP.

The Broadcast TWT Recommendation subfield contains a value that indicates recommendations on the types of frames that are transmitted by TWT scheduled STAs and the scheduling AP during the broadcast TWT SP, with values as follows. A value of 0 indicates that there are no constraints on the frames transmitted during a broadcast TWT SP. A value of 1 indicates that the Trigger frame will be transmitted by the TWT scheduling AP during the broadcast TWT SP does not contain RUs for random access and Orthogonal Frequency Division Multiple Access (OFDMA)-based random access (UORA). A value of 2 indicates that the number of Trigger frames transmitted by the TWT scheduling AP during the broadcast TWT SP contain at least one Resource Unit (RU) for random access and Uplink OFDMA Random Access (UORA). A value of 3 indicates no constraints on the frames transmitted during a broadcast TWT SP except that the AP transmits a Traffic Indication Map (TIM) frame, or a Fast Initial Link Setup (FILS) Discovery Frame including a TIM element at the beginning of each TWT SP. A value of 4 indicates that the corresponding broadcast TWT service period is a restricted TWT SP. Values of 5 through 7 are reserved.

The TWT Wake Interval Exponent subfield is set to the value of the exponent of the TWT wake interval is a binary value representing microseconds.

FIG. 5 depicts the Broadcast TWT Info subfield in TWT parameter set field, having the following subfields. A Restricted TWT Traffic Info Present subfield, when included in the Restricted TWT Parameter Set field, is set to 1 to indicate that the Restricted TWT Traffic Info field is present; and set to 0 otherwise.

Within a TWT element that includes a TWT setup command value of Request TWT, Suggest TWT or Demand TWT, the Broadcast TWT ID, if present, indicates a specific Broadcast TWT in which the transmitting STA is requesting to participate. Within a TWT element that includes a TWT setup command value of Accept TWT, Alternate TWT, Dictate TWT or Reject TWT, the Broadcast TWT ID, if present, indicates a specific Broadcast TWT for which the transmitting STA is providing a TWT parameter. Within a TWT element that includes a TWT setup command value of TWT Grouping, the Broadcast subfield is 0 and the Broadcast TWT ID, is not present. The value 0 in the Broadcast TWT ID subfield indicates the broadcast TWT whose membership corresponds to all STAs that are members of the BSS corresponding to the BSSID of the Management frame carrying the TWT element.

It should be noted that the Broadcast TWT ID subfield in a R-TWT Parameter Set field is always set to a nonzero value. The Broadcast TWT Persistence subfield indicates the number of TBTTs during which the Broadcast TWT SPs corresponding to this broadcast TWT Parameter set are present.

FIG. 6 depicts the Restricted TWT Traffic Info field, having the following subfields. The Traffic Information Control subfield is described in FIG. 7. The Restricted TWT DL TID Bitmap and Restricted TWT UL TID Bitmap subfields specify which TID(s) are identified by the TWT scheduling AP or the TWT scheduled STA as latency sensitive traffic streams in the downlink and uplink direction, respectively. If this value is set to a 1 at bit position k in the bitmap indicates that TID k is classified as a latency sensitive traffic stream. If the value at bit position k in the bitmap is set to a 0, then this indicates that TID k is not classified as a latency sensitive traffic stream.

FIG. 7 depicts a Traffic Info Control field of the Restricted TWT Traffic Info field, having the following subfields. The DL TID Bitmap valid subfield indicates if the Restricted TWT DL TID Bitmap field has valid information. When the value is set to 0, this indicates that the DL traffic of all TIDs is identified as latency sensitive traffic, and the Restricted TWT DL Bitmap field is reserved.

The UL TID Bitmap valid subfield indicates if the Restricted TWT UL TID Bitmap field has valid information. When the value is set to 0, it indicates that UL traffic of all TIDs is identified as latency sensitive traffic, and the Restricted TWT UL Bitmap field is reserved.

1.1.2. TWT Information Field

FIG. 8 depicts the frame format of the TWT Information field, having the following subfields. The TWT Flow Identifier subfield contains the TWT flow identifier for which TWT information is requested, or is being provided.

The TWT Flow Identifier subfield is reserved if the All TWT subfield is 1. The Response Requested subfield indicates whether the transmitter of the frame containing the TWT Information field is requesting a TWT Information frame to be transmitted in response to this frame. The Response Requested subfield is set to 0 to request the recipient is not to transmit a TWT Information frame in response to the frame. Otherwise, it is to request the recipient to transmit a TWT Information frame in response to the frame.

The Next TWT Request subfield is set to 1 to indicate that the TWT Information frame is a request for the delivery of a TWT Information frame containing a non-zero length Next TWT field; otherwise, the value is set to 0. The Next TWT Subfield Size subfield describes the size of the Next TWT subfield. For example, a value of 0 indicates the size of the Next TWT subfield is 0 bits; a value of 1 indicates the size is 32 bits; a value of 2 indicates the size is 48 bits, and a value of 3 indicates the size is 64 bits.

The All TWT Subfield is set to 1 by an HE STA to indicate that the TWT Information frame reschedules all TWTs; otherwise, the value is set to 0.

The Next TWT Subfield is of a variable size as determined by the Next TWT Subfield value. The value contained in the Next TWT subfield is the least significant portion of the TSF at the next TWT for the TWT specified by the TWT Flow Identifier subfield.

1.2. R-TWT Signaling

FIG. 9 depicts an example of a TWT setup defined in IEEE 802.11ax. The interworking model of the STAs could be the same as defined in IEEE 802.11 standard.

The non-AP STA decides (determines) to initiate a TWT setup procedure with the AP. The Station Management Entity (SME) of the non-AP STA sends a MLME-TWT-SETUP.request message to its Medium Access Control (MAC) Sublayer Management Entity (MLME). When the MLME of the non-AP STA receives the MLME-TWT-SETUP.request message, it collects the information in the MLME-TWTSETUP.request message and sends a TWT setup frame (i.e., TWT request frame) to the AP. The MLME of the AP receives the frame and generates a MLME-TWTSETUP.indication message to its SME.

Then, the SME of the AP sends an MLME-TWTSETUP.response message containing TWT setup results to its MLME. Then, the MLME of the AP sends a TWT setup frame (i.e., TWT response frame) to the non-AP STA. The MLME of the non-AP STA receives the frame and sends an MLME-TWTSETUP.confirm message to its SME; from which the non-AP can recognize whether the TWT setup was successful or not.

Figure 10:
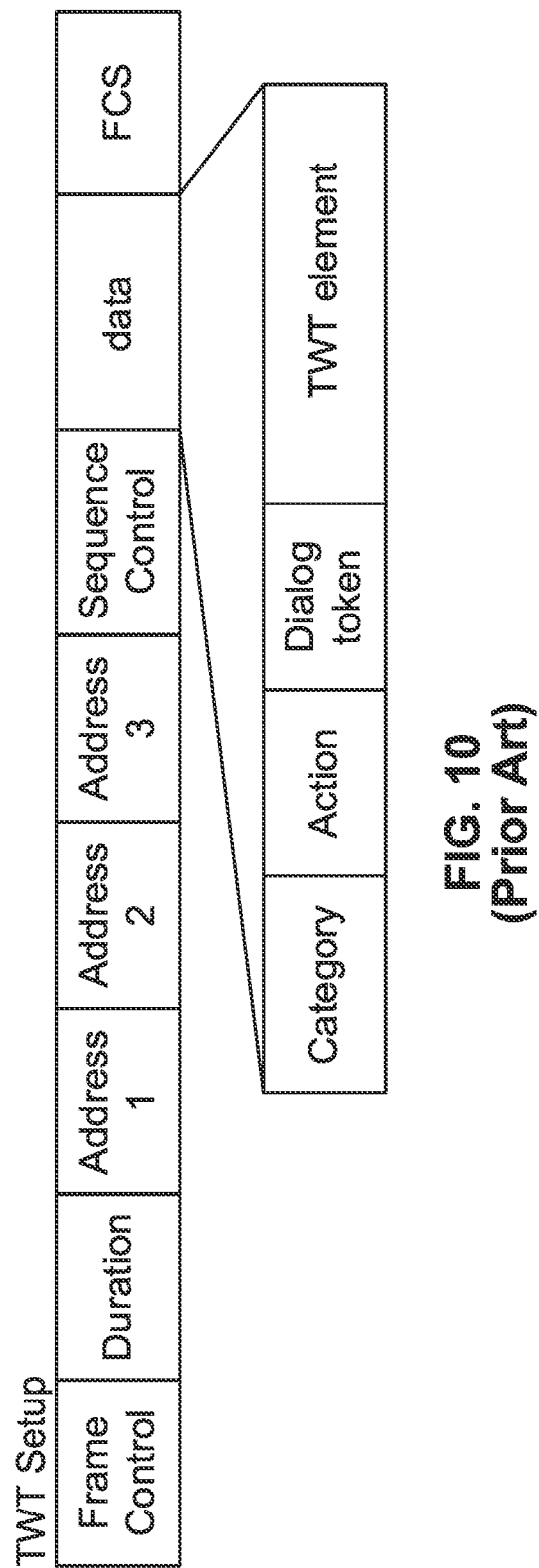
FIG. 10 is a data field diagram of a TWT setup frame.

FIG. 10 depicts the format of a TWT setup frame, whose TWT element in the frame was shown in FIG. 1. According to the definition in IEEE 802.11be, a restricted TWT (R-TWT) scheduling AP, referred to as an R-TWT scheduling AP, is an EHT AP that supports restricted TWT operation and sets the Restricted TWT Support subfield in the transmitted EHT Capabilities elements to 1.

A restricted TWT (R-TWT) scheduled STA, referred to as an R-TWT scheduled STA, is a non-AP EHT STA that supports restricted TWT operation and sets the Restricted TWT Support subfield in transmitted EHT Capabilities elements to a value of 1.

A R-TWT scheduled STA can establish membership of one or more R-TWTs scheduled by the R-TWT scheduling AP. The R-TWT setup signaling is the same as the broadcast TWT with additional parameter settings, which are used for membership negotiation of a R-TWT between the R-TWT scheduled STA and the R-TWT scheduling AP. After a R-TWT scheduled STA establishes the membership of the R-TWT scheduled by the R-TWT scheduling AP, the R-TWT scheduled STA has higher priority or is allowed to exchange frames with the R-TWT scheduling AP during the SPs of the R-TWT. On the other hand, the R-TWT scheduled STA that is not a member of the R-TWT either has a lower priority or is not allowed to exchange frames with the R-TWT scheduling AP during the SPs of the R-TWT.

Figure 11:
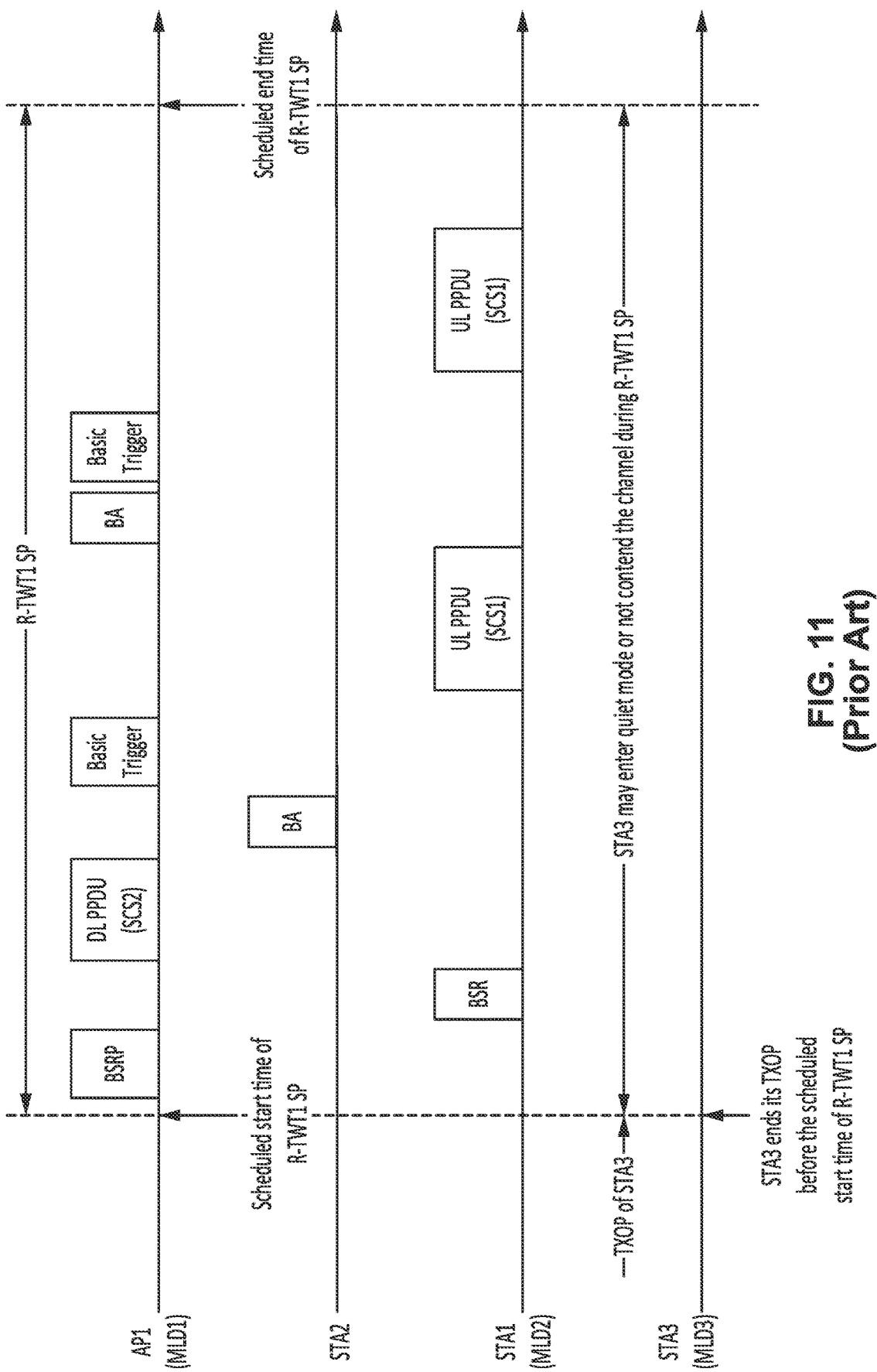
FIG. 11 is a communications diagram of an example for performing a R-TWT SP.

FIG. 11 depicts an example of performing a R-TWT SP. AP1 is an R-TWT scheduling AP which announces R-TWT1 scheduling and manages the members of R-TWT1. STA1 and STA2 are the member STAs of R-TWT1. During the R-TWT1 SP, AP1 schedules and prioritizes frame exchange with the member STAs (e.g., UL PPDU of SCS1 with STA1, and DL PPDU of SCS2 with STA2). STAs which can receive (hear) and recognize (understand) the R-TWT scheduling are called R-TWT scheduled STAs. STA3 is a R-TWT scheduled STA, but is not a member STA of R-TWT1. STA3 has to end its TXOP before the start time of R-TWT1 SP. STA3 can also enter quiet mode, or may decide not to contend for the channel during R-TWT1 SP. The scheduling AP can broadcast a quiet element to announce a quiet interval during a R-TWT SP, and the STA which receives (hears) this element may elect to enter quiet mode.

1.3. UL OFDMA-Based Random Access (UORA)

UORA is a feature of IEEE802.11ax for a non-AP HE STA to access the channel using RA-RU that is assigned by the associated HE AP. An HE AP may transmit a Basic Trigger frame, BQRP Trigger frame or BSRP Trigger frame that contains one or more RUs for random access. The AP shall indicate the range of OFDMA contention window (OCW) for non-AP STAs to initiate random access following the reception of the Trigger frame sent by the AP.

The OCW, which is an integer in the range from OCWmin to OCWmax, is set in the UORA Parameter Set element, which is contained in Management frames, such as Beacon, Probe Response or (Re) Association Response frames.

Each time a non-AP HE STA associates with a different AP, and prior to the initial attempt of RA-RU transmission towards it, the non-AP HE STA shall set the value of OCW to the OCWmin value and shall initialize its OFDMA random access backoff (OBO) counter in the range 0 to OCW. The (OBO) counter is used by the non-AP HE STA to count down before accessing the RA-RUs.

Upon the reception of a Trigger frame containing at least one eligible RA-RU, the HE STA that has a pending frame for the AP can randomly select one of the eligible RA-RUs for transmission if the OBO counter is not greater than the number of eligible RA-RUs and shall set its OBO counter to zero. Otherwise, the HE STA decrements its OBO counter by the number of eligible RA-RUs in the Trigger frame. It should be noted that 802.11BE currently doesn't support UORA in R-TWT.

2. Problem Statement

In current wireless communication systems using Enhanced Distributed Channel Access (EDCA) and R-TWT to prioritize RTA traffic transmission during a R-TWT SP, the RTA traffic is prioritized for transmission. However, the duration of the R-TWT SP is scheduled for the R-TWT member STAs; while the non-AP STAs that are not members of a specific R-TWT SP generally have limited channel access to the R-TWT SPs. One reason for this access limitation is because the R-TWT scheduling AP is not aware of the status of the non RTWT members as being either asleep or awake, and thus, would not spontaneously trigger the non-R-TWT members. Although STAs may still contend for a R-TWT SP of which they don't have membership, they may have less chance than the scheduling AP to obtain the TXOP, since the AP may have faster Arbitration Inter-frame Spacing (AIFS) (with AIFS Number (AFSN) being greater than, or equal to, 1) than non-AP STAs (with AIFSN[AC] being greater than or equal to 2). In this context, a burst of RTA packets may be enqueued in STAs that are not members of the ongoing R-TWT SP and thus suffer delay until their own scheduled R-TWT SP arrival.

Accordingly, a mechanism is needed for setting up a temporary or a long-term R-TWT membership to the STAs that were originally not a member of the current R-TWT SP but have a burst of RTA traffic to transmit in the current ongoing R-TWT SP.

3. Contribution of the Present Disclosure

By utilizing the present disclosure, STAs that have queued up burst RTA traffic but do not have membership in the current ongoing R-TWT SP can immediately negotiate with the scheduling AP inside the current R-TWT SP to setup a temporary or a long-term membership to use this R-TWT SP or setup a new R-TWT SP which follows the current R-TWT SP for transmitting the RTA traffic with an equal priority as given to the R-TWT members.

4. Embodiments 4.1. Communication Station (STA and MLD) Hardware

Figure 12:
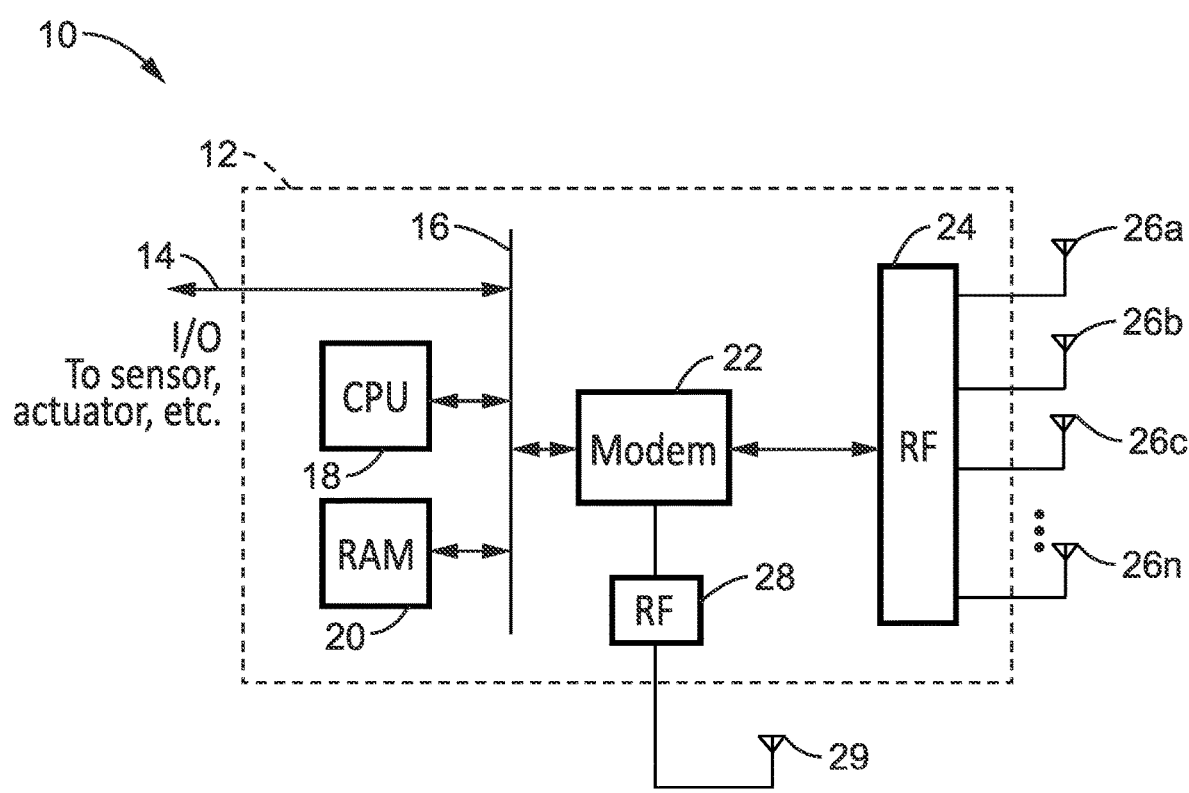
FIG. 12 is a block diagram of communication station hardware, according to at least one embodiment of the present disclosure.

FIG. 12 illustrates an example embodiment 10 of STA hardware configured for executing the protocol of the present disclosure. An external I/O connection 14 preferably couples to an internal bus 16 of circuitry 12 upon which are connected a CPU 18 and memory (e.g., RAM) 20 for executing a program(s) which implements the communication protocol. The host machine accommodates at least one modem 22 to support communications coupled to at least one RF module 24, 28 each connected to one or multiple antennas 29, 26a, 26b, 26c through 26n. An RF module with multiple antennas (e.g., antenna array) allows for performing beamforming during transmission and reception. In this way, the STA can transmit signals using multiple sets of beam patterns.

Bus 14 allows connecting various devices to the CPU, such as to sensors, actuators and so forth. Instructions from memory 20 are executed on processor 18 to execute a program which implements the communications protocol, which is executed to allow the STA to perform the functions of an access point (AP) station or a regular station (non-AP STA). It should also be appreciated that the programming is configured to operate in different modes (TXOP holder, TXOP share participant, source, intermediate, destination, first AP, other AP, stations associated with the first AP, stations associated with the other AP, coordinator, coordinatee, AP in an OBSS, STA in an OBSS, and so forth), depending on what role it is performing in the current communication context.

Thus, the STA HW is shown configured with at least one modem, and associated RF circuitry for providing communication on at least one band. It should be appreciated that the present disclosure can be configured with multiple modems 22, with each modem coupled to an arbitrary number of RF circuits. In general, using a larger number of RF circuits will result in broader coverage of the antenna beam direction. It should be appreciated that the number of RF circuits and number of antennas being utilized is determined by hardware constraints of a specific device. A portion of the RF circuitry and antennas may be disabled when the STA determines it is unnecessary to communicate with neighboring STAs. In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

In addition, it will be noted that multiple instances of the station hardware, such as shown in this figure, can be combined into a multi-link device (MLD), which typically will have a processor and memory for coordinating activity, although it should be appreciated that these resources may be shared as there is not always a need for a separate CPU and memory for each STA within the MLD.

Figure 13:
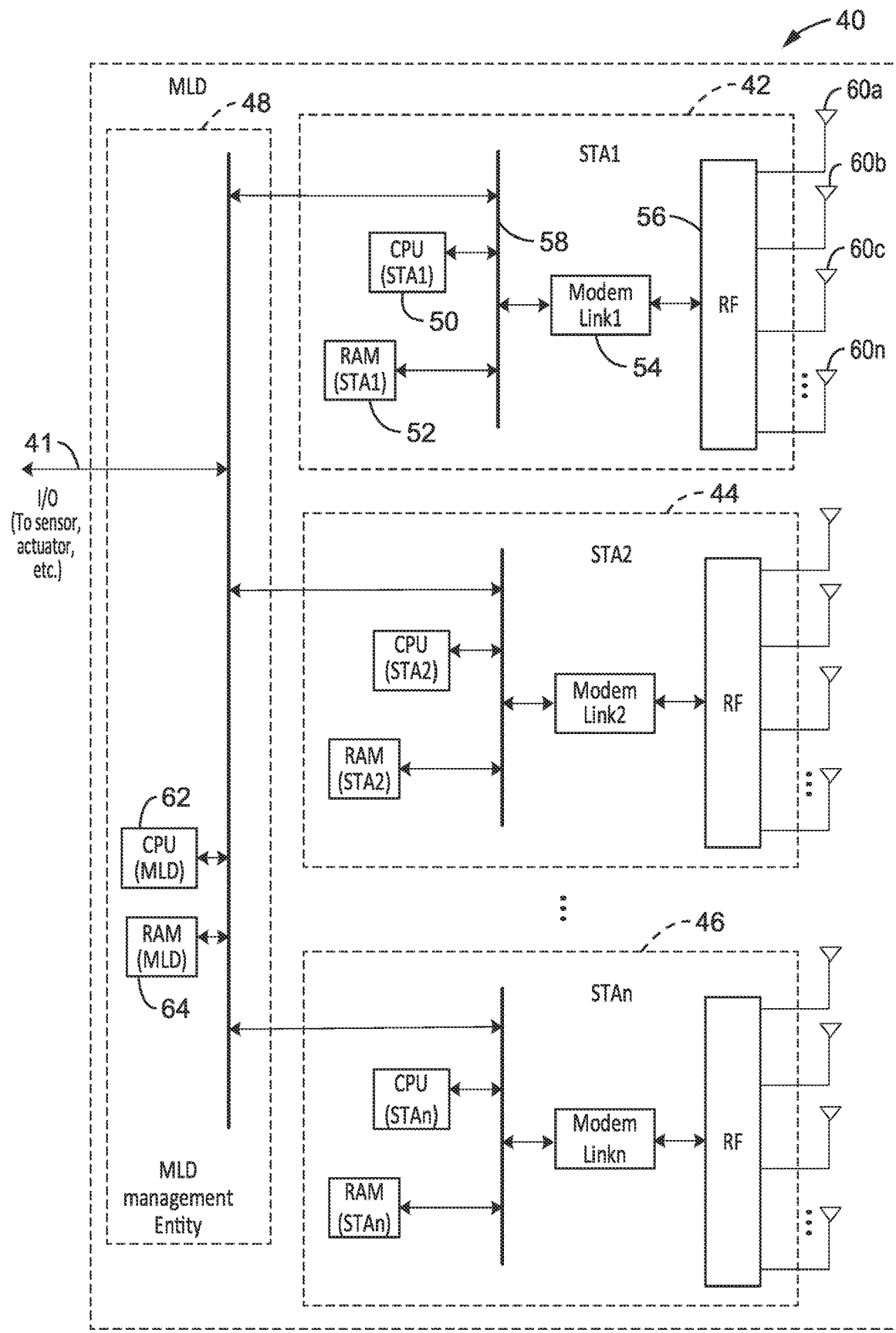
FIG. 13 is a block diagram Multi-Link Device (MLD) hardware according to at least one embodiment of the present disclosure.

FIG. 13 illustrates an example embodiment 40 of a Multi-Link Device (MLD) hardware configuration. Soft AP MLD is a MLD that consists of one or more affiliated STAs, which are operated as APs. A soft AP MLD should support multiple radio operations on 2.4 GHz, 5 GHz and 6 GHz. Among multiple radios, basic link sets are the link pairs that satisfy simultaneous transmission and reception (STR) mode, e.g., basic link set (2.4 GHz and 5 GHz), basic link set (2.4 GHz and 6 GHZ).

The conditional link is a link that forms a non-simultaneous transmission and reception (NSTR) link pair with some basic link(s). For example, these link pairs may comprise a 6 GHz link as the conditional link corresponding to 5 GHz link when 5 GHz is a basic link; 5 GHz link is the conditional link corresponding to 6 GHz link when 6 GHz is a basic link. The soft AP is used in different scenarios including Wi-Fi hotspots and tethering.

Multiple STAs are affiliated with an MLD, with each STA operating on a link of a different frequency. The MLD has external I/O access to applications, this access connects to a MLD management entity 48 having a CPU 62 and memory (e.g., RAM) 64 to allow executing a program(s) that implements communication protocols at the MLD level. The MLD can distribute tasks to, and collect information from, each affiliated station to which it is connected, exemplified here as STA 1 42, STA 2 44 through to STA N 46 and the sharing of information between affiliated STAs.

In at least one embodiment, each STA of the MLD has its own CPU 50 and memory (RAM) 52, which are coupled through a bus 58 to at least one modem 54 which is connected to at least one RF circuit 56 which has one or more antennas. In the present example the RF circuit has multiple antennas 60a, 60b, 60c through 60n, such as in an antenna array. The modem in combination with the RF circuit and associated antenna(s) transmits/receives data frames with neighboring STAs. In at least one implementation the RF module includes frequency converter, array antenna controller, and other circuits for interfacing with its antennas.

It should be appreciated that each STA of the MLD does not necessarily require its own processor and memory, as the STAs may share resources with one another and/or with the MLD management entity, depending on the specific MLD implementation. It should be appreciated that the above MLD diagram is given by way of example and not limitation, whereas the present disclosure can operate with a wide range of MLD implementations.

4.2. STA Topology Example

Figure 14:
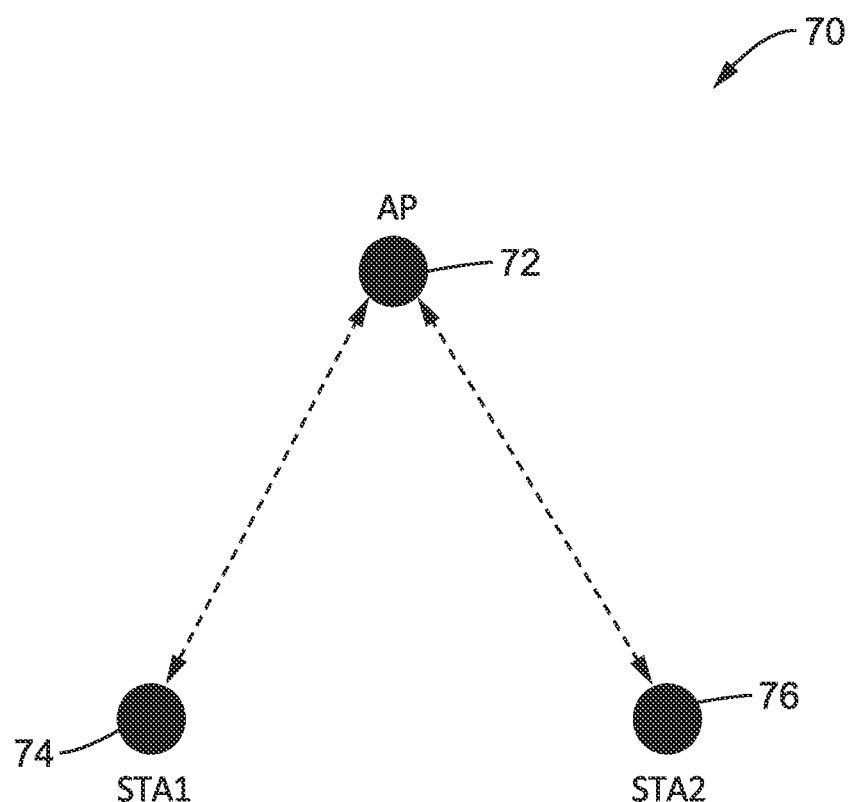
FIG. 14 is a network topology used in examples according to at least one embodiment of the present disclosure.

FIG. 14 illustrates an example STA topology 70 for consideration in the examples of the present disclosure. The figure is provided to aid in the discussions of the techniques involved towards engendering an improved understanding of the proposed technology. It should be appreciated that the present disclosure is in no way limited to the topology of this example, as the protocol may be utilized on communications between WLAN STAs and MLDs of any desired topology.

A Multi-Link Device (MLD) is a device that has more than one affiliated STA and has one Medium Access Control (MAC) Service Access Point (SAP) to Logical Link Control (LLC), which includes one MAC data service.

An MLD is an AP MLD if APs are affiliated with that MLD. An MLD is a non-AP MLD if non-AP STAs are affiliated with that MLD.

As shown in FIG. 14 the scenario is exemplified as having three total stations shown as one Access Point (AP) 72, and two non-AP STAs of STA1 74 and STA2 76 which communicate with the AP. All STAs use EDCA for random channel access.

A R-TWT scheduling AP is able to schedule and announce R-TWT SPs. A R-TWT scheduled STA is the non-AP STA that is able to receive and recognize the R-TWT announcement from the R-TWT scheduling AP and support R-TWT operations. A R-TWT scheduled STA is able to negotiate the membership of a R-TWT with the AP serving as the R-TWT scheduling AP. When a R-TWT scheduled STA becomes a member STA of a R-TWT, the traffic (e.g., UL, DL, P2P) of the R-TWT scheduled STA (i.e., the R-TWT member STA) is scheduled and prioritized to transmit during the SPs of that R-TWT.

In this example figure, the AP is the R-TWT scheduling AP, and both STA1 and STA2 are R-TWT scheduled STAs.

4.3. Urgent R-TWT Membership Request in Current R-TWT SP

In this section, a mechanism is described in which non-AP R-TWT scheduled STAs (STAs), which have at least one R-TWT membership of R-TWT SP(s), which are different from the current ongoing R-TWT SP, have urgent burst UL flow to transmit and can immediately initiate a R-TWT negotiation with the scheduling AP instead of waiting for their scheduled R-TWT SP. The non-R-TWT member STA can request to be accepted as a new member (temporarily or for a longer term) of the current R-TWT SP so that they can deliver the urgent burst UL flow with the same priority as the original R-TWT members in the current R-TWT SP upon STA receiving the agreement from the scheduling AP.

The R-TWT negotiation between the non-R-TWT member STAs and the scheduling AP is based on the exchange of frames (e.g., TWT request frame and TWT response frame that carry TWT elements with a Negotiation Type subfield indicating this type of action, such as being equal to "3" in the examples herein.

The reserved subfield of the Request Type field in the Broadcast TWT parameter Set field can be used by the non-AP STA to request membership (temporary or long-term) of the current R-TWT SP using the newly defined "Temporary Member" subfield as shown in FIG. 25. It can also be used by the scheduling AP to indicate membership acceptance, or to assign the requested STA a new R-TWT membership of current R-TWT.

In at least one embodiment this field provides multiple option, two options in this example, to indicate that either a temporary or a long-term membership is requested by the scheduled non-AP STA or is assigned by the scheduling AP.

The scheduled non-AP STA that is assigned a temporary membership of the current R-TWT SP has only provided a one-time use agreement for the R-TWT member to be a member of the current ongoing R-TWT SP.

The scheduling AP that agrees to assign long-term membership to the requesting non-AP STA for using a specific R-TWT SP should maintain the membership for the requesting non-AP scheduled STA of using this R-TWT SP (identified by e.g., a Broadcast TWT ID) until this non-AP STA performs a teardown of the R-TWT agreement.

The scheduling AP may accept or reject the request from the STA that has requested to be a new member of the current R-TWT SP or it may indicate an alternate R-TWT setup, or dictate a preferred R-TWT setup from the STA.

4.4. Urgent New R-TWT SP Setup During Current R-TWT SP

In this section, a mechanism is described for STAs that have urgent burst UL flow but have not originally obtained R-TWT membership in the current R-TWT SP; wherein they attempt to setup another (temporary or long-term) R-TWT SP with the scheduling AP during this current R-TWT SP. The other (temporary or long-term) R-TWT SP may immediately follow the current R-TWT SP and should be setup as soon as possible before the time is reached for the originally scheduled R-TWT SP(s) of the requesting STA.

It should be noted that the new (temporary or long-term) R-TWT SP for the requesting STAs may overlap in the time domain with an existing R-TWT SP, of which the requesting STAs doesn't have R-TWT membership. In this case, the requesting STAs should still have a high access priority since they are members of the new R-TWT SP.

The new R-TWT SP can be setup by sending a new proposed R-TWT information frame to the scheduling AP.

Upon receiving the R-TWT information frame from the non-AP STA, the scheduling AP should respond with a frame to schedule the Next TWT and indicate if the next R-TWT is a temporary or a long-term R-TWT SP for the scheduled STA which sent the R-TWT information frame.

The new R-TWT information frame is designed based on the TWT Information field and maintains the flexible TWT feature as defined in IEEE802.11ax_D8.0. In addition, the proposed R-TWT information frame may contain the Restricted TWT Traffic Info field, as introduced in FIG. 6, to indicate the requested/accepted RTA traffic information in the new R-TWT SP and a Temporary R-TWT field to indicate if the request is for a temporary or a long-term R-TWT SP. The frame format of the proposed R-TWT information frame will be shown in FIG. 26.

The non-AP STA which initiated the R-TWT information frame exchange can use the new temporary or long-term R-TWT SP to transmit the burst UL flow upon receiving the agreement from the scheduling AP.

4.5. Urgent Non-R-TWT Member STA Transmission Using UORA

Current IEEE 802.11be supports UORA in B-TWT by setting the Broadcast TWT Recommendation subfield for a B-TWT element to a value of 2. A broadcast TWT parameter set that has the Broadcast TWT Recommendation field equal to a value of 4 indicates a R-TWT parameter set, there is currently no limitation nor requirement to use UORA for R-TWT.

In this section a new value is defined for the Broadcast TWT Recommendation field to indicate that Trigger frames transmitted by the R-TWT scheduling AP during the R-TWT SP contains at least one RU for random access. In this case, RA-RU can be used by both the non-R-TWT member STAs and R-TWT member STAs.

A new value, for example "5", for the Broadcast TWT Recommendation field can be setup to indicate enabling UORA features in R-TWT SP. The new feature can be initially enabled at the beginning of each R-TWT SP. Alternatively, this feature can be initiated by the STA, which has not obtained R-TWT membership in this R-TWT SP, by exchanging negotiation frames (e.g., R-TWT request and R-TWT response) with the scheduling AP during the current ongoing R-TWT SP.

When the UORA feature is enabled in the current ongoing R-TWT SP, the non-R-TWT member STA which has a burst of RTA packets to transmit may use the RA-RU in the current R-TWT SP based on the UORA transmission procedure as defined in the standard.

Both R-TWT member STAs and non-R-TWT member STAs can contend for RA-RUs to transmit. When the OFDMA Back Off (OBO) counter counts down to zero, the non-R-TWT member STA can directly send an Up Link (UL) Physical layer convergence procedure Protocol Data Unit (PPDU) using one Random Access-Resource Unit (RA-RU) or can send a Buffer Status Report (BSR) in the RA-RU to allow the scheduling AP to allocate specific RUs to it, so that it can have direct access in next triggered UL PPDU transmission.

Figure 15:
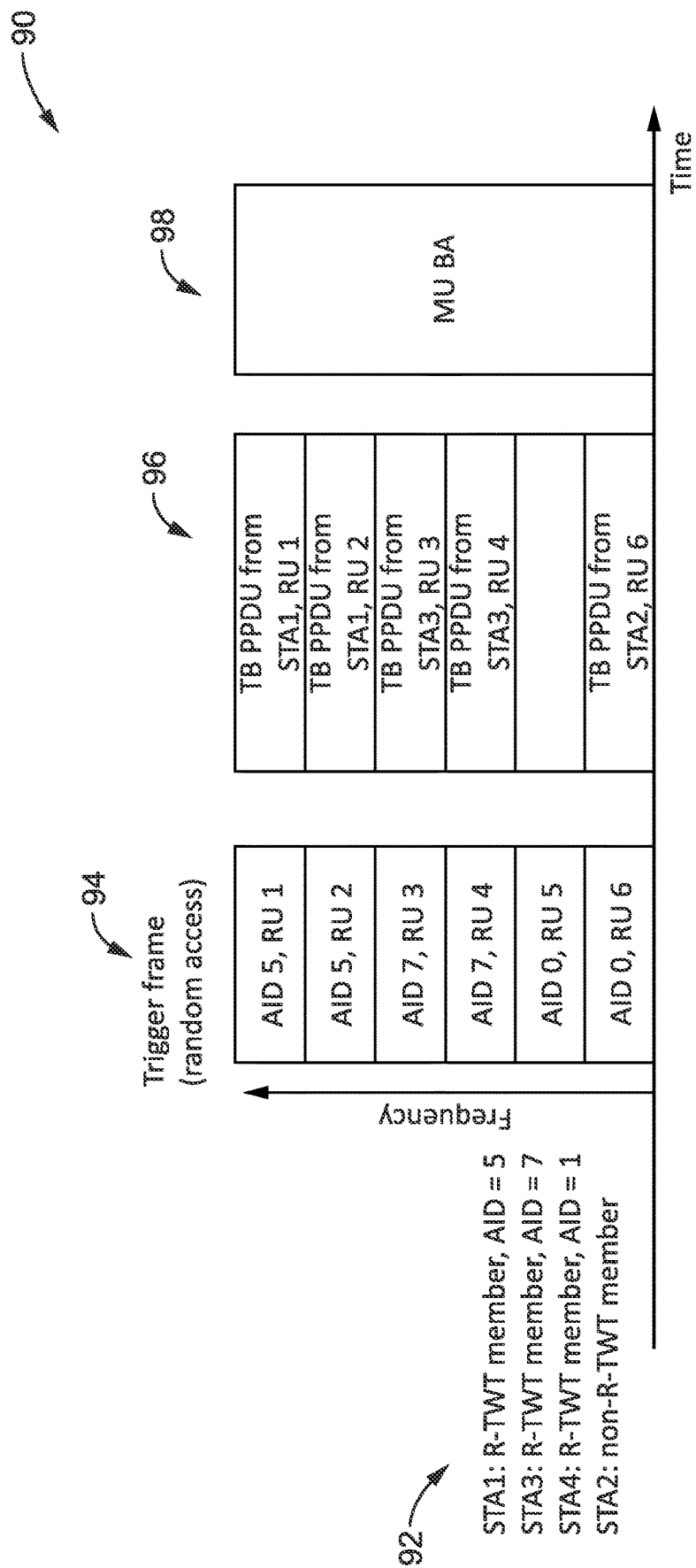
FIG. 15 is a communications diagram of an RA-RU process of a non-R-TWT member STA, according to at least one embodiment of the present disclosure.

FIG. 15 illustrates an example embodiment 90 of an RA-RU process of a non-R-TWT member STA (e.g., STA2) and R-TWT member STAs (e.g., STA1, STA3 and STA4) when UORA is enabled in R-TWT SP. The RUs are shown as spanning a portion of the frequency spectrum. The figure depicts AID values 92 for STA1 through STA4, each of which had initial OBO values before the Trigger frame was sent by the scheduling AP.

Upon receiving Trigger frame 94 from the scheduling AP, the following allocations 96 take place. STA1 and STA3 both are members of this R-TWT SP and have pending frames for the scheduling AP. STA1 is allocated dedicated RUs (RU1 and RU2) and STA3 is allocated dedicated RUs (RU3 and RU4). STA1 and STA3 don't contend for the RA-RUs and instead transmit their pending frames on their allocated RUs.

STA4 is a member of this R-TWT SP and has pending frames for the scheduling AP. STA4 does not receive allocated RUs from the Trigger frame, so it will contend for the RA-RUs. STA4 decrements it OBO counter by the number of eligible RA-RUs indicated in the Trigger frame (i.e., two RA-RUs for associated STAs in this case). Assuming that the OBO counters of STA4 decrement to a nonzero value, STA4 maintains the new OBO value until it receives a later Trigger frame carrying RA-RUs from the scheduling AP.

STA2 is not a member of this R-TWT SP although it has pending frames for the scheduling AP. STA2 decrements its OBO counter by the number of eligible RA-RUs indicated in the Trigger frame (i.e., two RA-RUs for associated STAs in this case). Assuming OBO counters of STA2 decrement to a terminal (e.g., zero) value, then it transmits its pending frames on RU6 that it randomly selected from eligible set of RUs (i.e., RU5 and RU6).

The receipt of these transmitted PPDUs in the RUs is acknowledged 98 in this instance by a Multi-User Block Acknowledgement (MU BA).

4.6. Urgent Non-R-TWT Member STA Transmission Using Guaranteed Unicast RU(s)

For the STAs that do not have membership in the current ongoing R-TWT SP, they can request to be a temporary member of current R-TWT SP and request unicast RU(s) for delivering their burst RTA traffic in the current ongoing R-TWT SP. The R-TWT scheduling AP may guarantee them unicast RU(s) upon accepting their request.

In this section, a setup is described which guarantees unicast RU(s) by defining a new value for the Broadcast TWT Recommendation subfield. The guaranteed unicast RU(s) is assigned by the scheduling AP to a specific AID, which is used by the new temporary R-TWT member STAs to transmit burst traffic to the AP.

A new value, for example "6", for the Broadcast TWT Recommendation field can be used to enable a unicast RU(s) feature in R-TWT. The new feature cannot be scheduled at the beginning of any R-TWT SP, since the scheduling AP does not have information (does not know) which non-member STA will request to be a member of this R-TWT SP, and thus the scheduling AP cannot set the unicast RU(s) to a specific AID.

The new unicast RU(s) in this R-TWT feature can be initiated during the current ongoing R-TWT SP by the non-R-TWT member STA by exchanging negotiation frames (e.g., TWT request and TWT response) with the scheduling AP.

Figure 16:
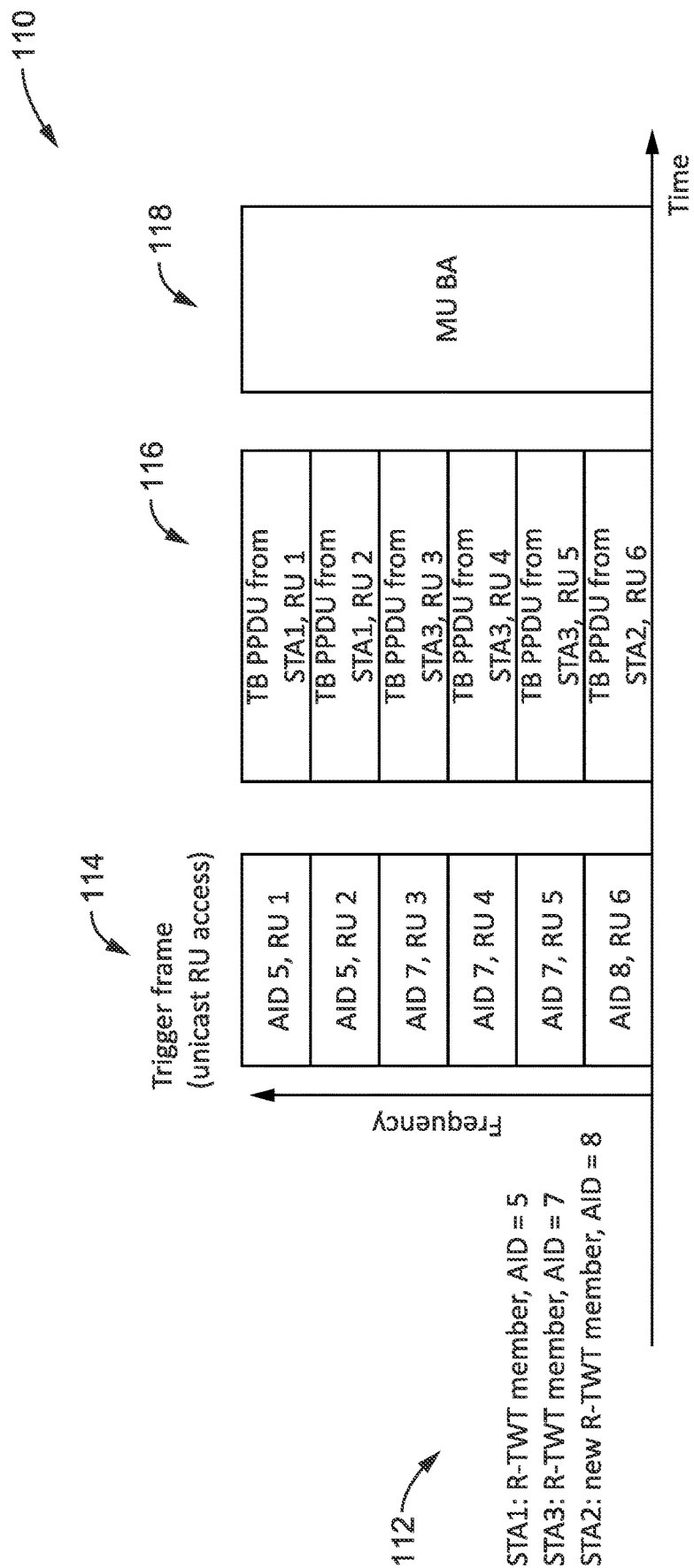
FIG. 16 is a communications diagram of a unicast RU(s) access process, according to at least one embodiment of the present disclosure.

FIG. 16 illustrates an example embodiment 110 of a unicast RU(s) access process showing station AIDs 112 for a temporary new R-TWT member STA (e.g., STA2) and R-TWT member STAs (e.g., STA1 and STA3) when guaranteed unicast RU(s) are enabled in the R-TWT SP.

STA2 was not a member of this triggered R-TWT SP, however, it has pending RTA bursts to send to the scheduling AP. STA2 can send a TWT request frame to the scheduling AP to request or suggest that it be added as a new temporary member and request unicast RU(s) during this R-TWT SP. The scheduling AP may accept, suggest/dictate an alternate, or reject the requested or suggested TWT setup commands from STA2.

Assuming the scheduling AP accepts the new TWT setup command from STA2, and the AP responds with a TWT response frame and sets the TWT setup Command field to "Accept TWT" and the Broadcast TWT Recommendation field to the new designed value (e.g., 6) to enable the unicast RU(s) feature in the current R-TWT SP.

STA2 becomes a new temporary member of the requested R-TWT SP after receiving the TWT response frame from the scheduling AP which includes an indication that the new TWT setup command has been is accepted.

Upon receiving the Trigger frame 114 from the scheduling AP. STA1 and STA3 both are seen as original members of this triggered R-TWT SP and have pending frames for the scheduling AP. STA1 is allocated dedicated RUs (RU1 and RU2) and STA3 is allocated dedicated RUs (RU3, RU4 and RU5). STA1 and STA3 should transmit their pending frames using their allocated RUs.

The scheduling AP allocates RU6 to STA2 (as indicated from the AID 8) in later Trigger frame. The new R-TWT member STA2 receives the Trigger frame indicating a unicast RU6 is assigned to it, and can immediately access RU6 to send UL PPDU.

The receipt of these transmitted PPDUs in the RUs is acknowledged by MU BA 118.

4.7. Allocating RA-RU Group AID for Non-R-TWT Member STAs

In this section, a mechanism is described for allocating RA-RU(s) to a new group AID, which is used for non-AP STAs that do not have membership in the current ongoing R-TWT SP, but that may buffer UL RTA traffic.

A new group AID allocating RA-RU(s) for non-R-TWT-members should be contained by the beacon frame body, which indicates when the R-TWT applies, and a new group AID will be specifically allocated to RA-RU(s) for non-R-TWT member STAs to provide access during any R-TWT SP.

In at least one embodiment/mode/option, the new group AID value can be one of the reserved values in the AID12 subfield of the User Info field of the Trigger frame based on values seen in Table 1 (which contains the material of Table 9-29h of the 802.11ax specification).

The new group AID value, e.g., 2050, indicates that the User Info field has allocated one or more contiguous RA-RUs for the associated non-R-TWT member STAs in any R-TWT SP. It should be noted that pre-EHT devices do not recognize the new group AID, thus they are unable to contend for accessing the RA-RU(s) allocated to the new group AID. A new value, such as "7", for the Broadcast TWT Recommendation field can be used to enable the allocated RA-RU(s) for the new group AID for non-R-TWT members in the R-TWT SP.

Figure 17:
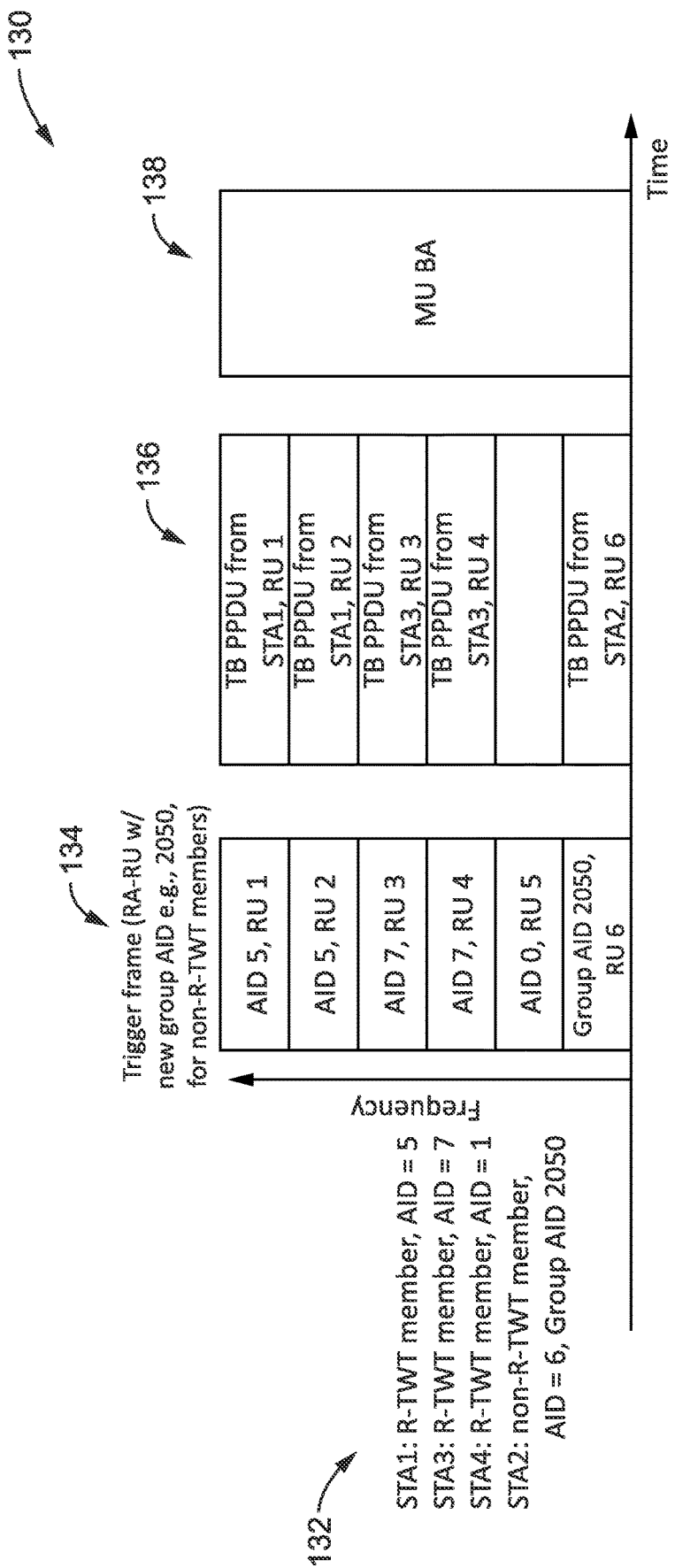
FIG. 17 is a communications diagram of a process for allocating an RA-RU 6 to the new group AID, according to at least one embodiment of the present disclosure.

FIG. 17 illustrates an example embodiment 130 of a process for allocating RA-RU 6 to the new group AID, e.g., 2050, for a non-R-TWT member STA (e.g., STA2). Status 132 shows STA1 through STA4 and their associated AIDs. R-TWT member STAs (e.g., STA1, STA3 and STA4) cannot contend for access using RA-RU 6, because RU6 has been allocated to STA(s) that has group AID 2050.

Trigger frame 134 contains the allocations from the scheduling AP. STA1 and STA3 both are members of this R-TWT SP and have pending frames for the scheduling AP. STA1 is allocated dedicated RUs (RU1 and RU2), and STA2 is allocated dedicated RUs (RU3 and RU4). STA1 and STA3 thus have no need to contend for RA-RUs and instead transmit their pending frames on their allocated RUs.

STA4 is a member of this R-TWT SP which has pending frames for the scheduling AP. Yet, STA4 is not allocated RUs in the Trigger frame, so it will contend for the RA-RUs. STA4 decrements it OBO counter by the number of eligible RA-RUs indicated in the Trigger frame (i.e., two RA-RUs for associated STAs in this case). Assuming the OBO counters of STA4 decrement to a nonzero value, it maintains the new OBO value until it receives a later Trigger frame carrying RA-RUs from the scheduling AP.

STA2 is not a member of this R-TWT SP and has pending frames for the scheduling AP. STA2 decrements its new Group AID OBO counter by the number of eligible RA-RUs indicated in the Trigger frame (i.e., one RA-RU for associated STAs in this case). Assuming the OBO counters of STA2 have decremented to a terminal (zero) value, then it transmits its pending frames on RU6.

So RU1 through RU4 and RU6 are shown transmitting 136 TB PPDUs, in response to which an MU BA is received 138.

4.8. Urgent R-TWT Membership Setup for Non-R-TWT Member STA in MLO

A MLD STA that does not have the R-TWT membership in the current ongoing R-TWT SP(s) on multiple links should be able to setup the proposed R-TWT agreement(s) for multiple links through negotiation on any available link. It should be noted that ML R-TWT SP setup through a negotiation frame exchange on one link has been proposed in a previous application of the Assignee.

Different proposed R-TWT agreements (Sections 4.3 through 4.6) can be setup on different links. For example, a R-TWT-X SP on L2 with UORA feature (as proposed in Section 4.5) and a R-TWT-Z SP on L3 with Unicast feature (as proposed in Section 4.6).

Upon receiving the TWT request frame, the scheduling AP should respond with a TWT response frame to announce the acceptance of the new R-TWT agreement on any requested operation link(s).

4.9. Flow Diagrams of the Protocol

FIG. 18 through FIG. 21 illustrate an example embodiment 150 of operations by a R-TWT scheduled STA.

In block 152 the STA gets a burst of traffic from its Application layer which is put into its EDCA queue. A check 154 determines if the station has a membership in the R-TWT SP on the transmission link. If it does have a membership, then at block 156 the STA merely awaits the trigger from the scheduling AP, and may then transmit.

If at block 154, it is found that the STA does not have a membership, then at block 158 the STA determines if it will send a negotiation frame to request (or suggest) to be added as a member of the current R-TWT on the transmission link.

Figure 19:
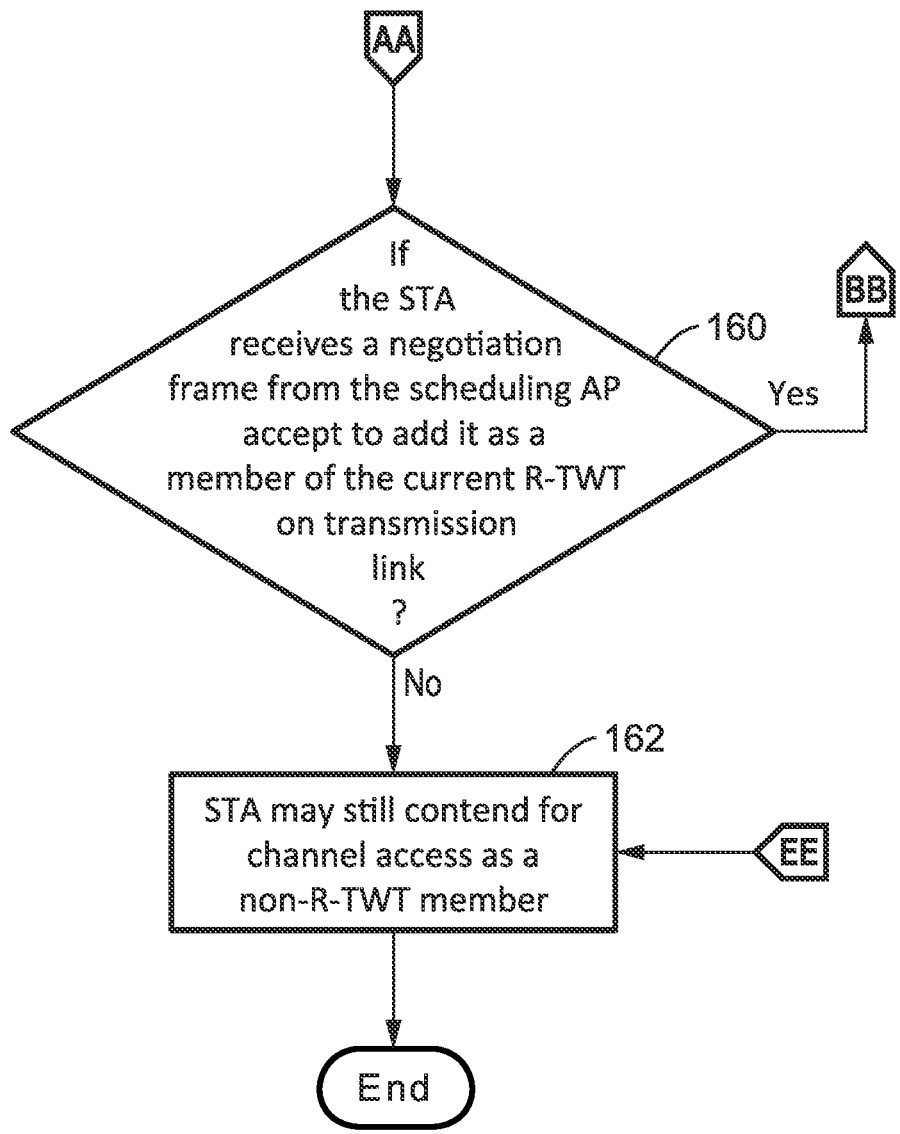

If the STA determines to request membership, then at block 160 in FIG. 19, a check is performed to determine if the STA have received a negotiation frame from the scheduling AP to accept adding it as the member of the current R-TWT on the transmission link.

Figure 18:
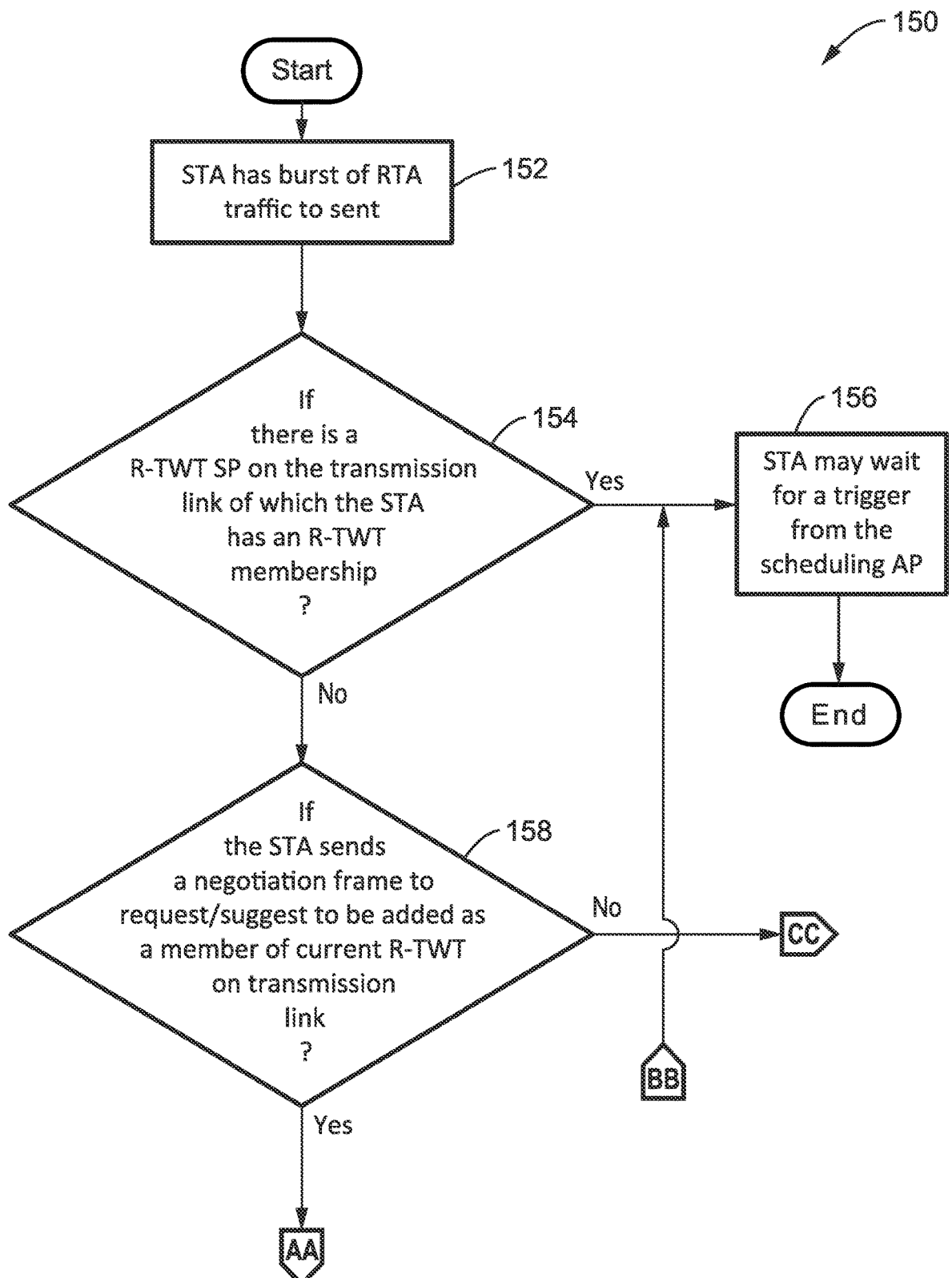
FIG. 18 through FIG. 21 is a flowchart of operations by a R-TWT scheduled STA, according to at least one embodiment of the present disclosure.

If it is determined at block 160 that the STA has been added to the R-TWT on the transmission link, then execution moves to block 156 in FIG. 18 where the STA awaits a trigger from the scheduling AP.

Otherwise, if it is determined at block 160 that the STA has not been added as a member for the transmission link, then at block 162 the STA may still contend for the channel as a non-R-TWT member.

Figure 20:
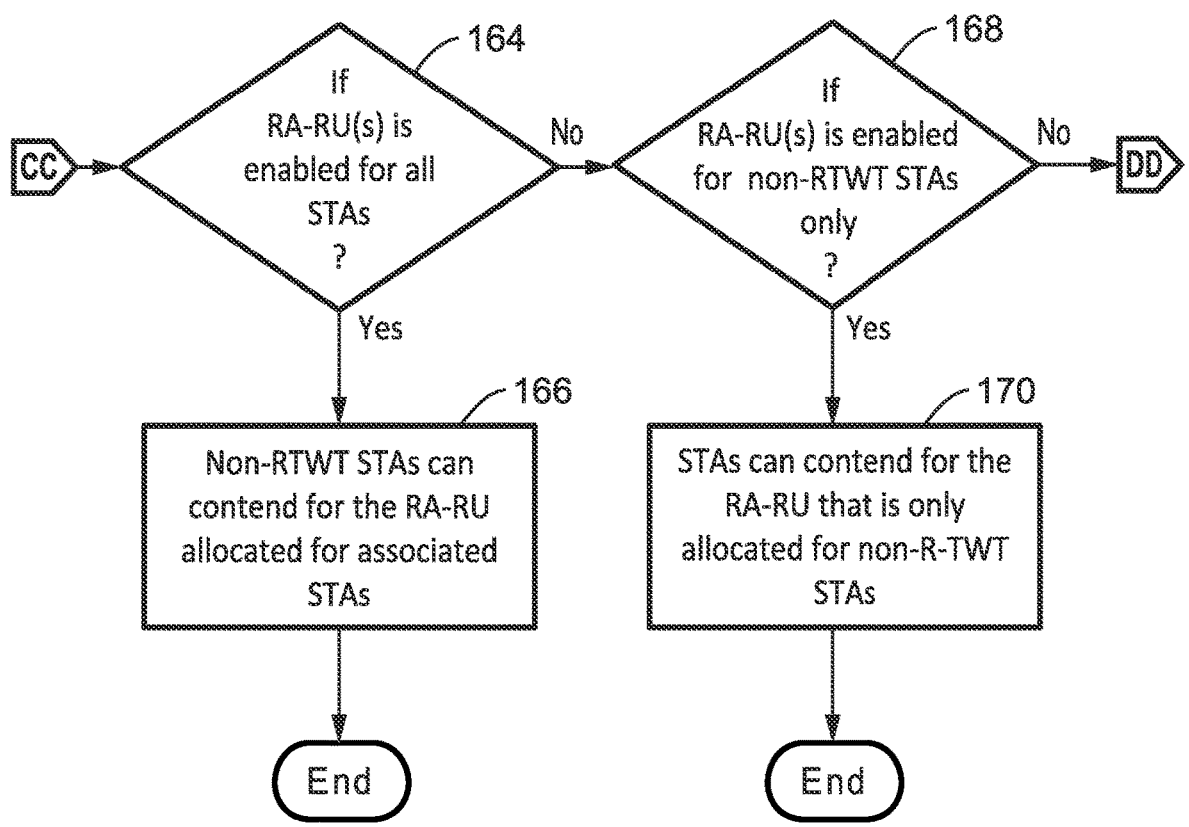
Figure 21:
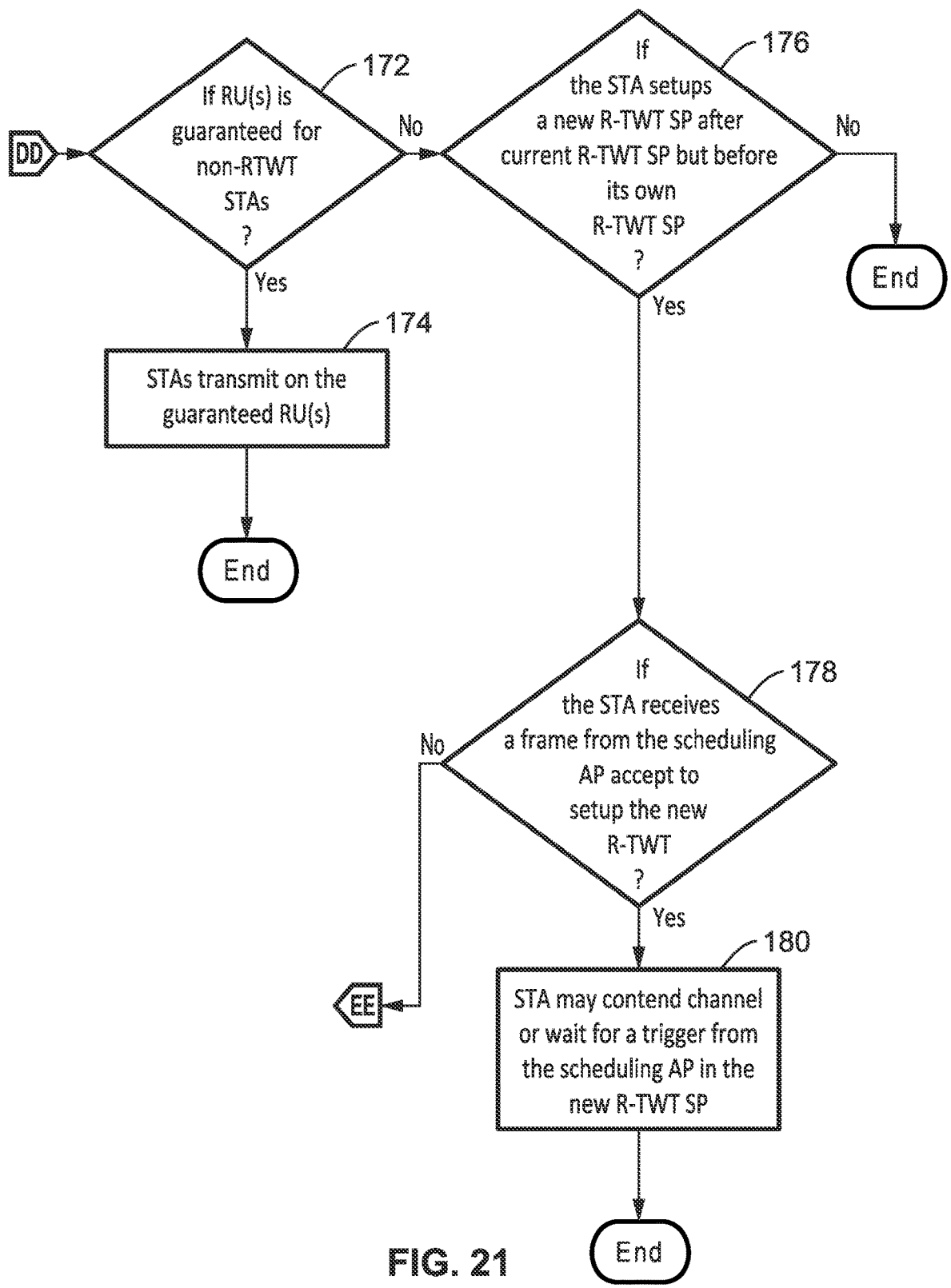

In check 158 of FIG. 18, if the STA does not request membership, then at block 164 of FIG. 20 a check is made 164 to determine if the RA-RU(s) is enabled for all STAs.

If it is enabled for all STAs, then at block 166, the non-RWT STAs can contend for the RA-RU allocated for the associated STAs. Otherwise, if RA-RU are not enabled for all stations, then at block 168 a check determines if the RA-RUs were enabled for the non-RTWT STAs only.

If the RA-RUs were enabled only for non-R-TWT STAs, then at block 170 STAs can contend for the RA-RU that is only allocated for non-R-TWT STAs. Otherwise, execution moves to check 172 of FIG. 21.

At check 172 if the RU(s) are guaranteed for non-R-TWT STAs, then at block 174 the STAs transmit on the guaranteed RU(s). Otherwise, execution moves to block 176 which checks if the STA has set up a new R-TWT SP after the current R-TWT SP but before its own R-TWT SP. If there is no setup for the R-TWT, then the process ends.

Otherwise, at block 178 a check determines if the STA has received a frame from the scheduling AP to accept a new setup of the new R-TWT. If it has not received the frame, then execution moves to block 162 in FIG. 19, which was already described. If it did receive the frame, then at block 180 the STA may contend for the channel or wait for a trigger from the scheduling AP in the new R-TWT SP.

Figure 22:
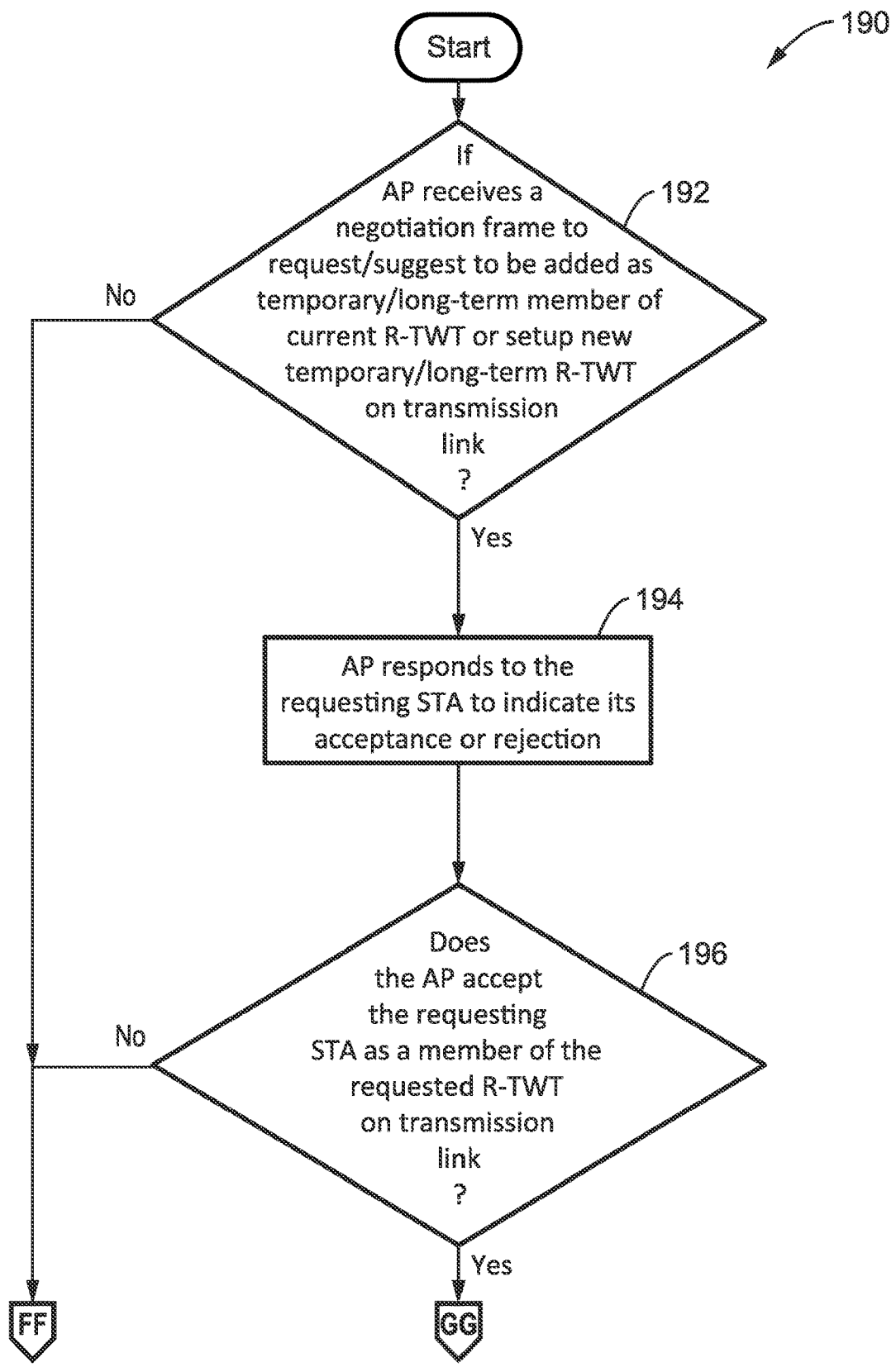
FIG. 22 through FIG. 24 is a flowchart of operations by a R-TWT scheduling AP, according to at least one embodiment of the present disclosure.
Figure 23:
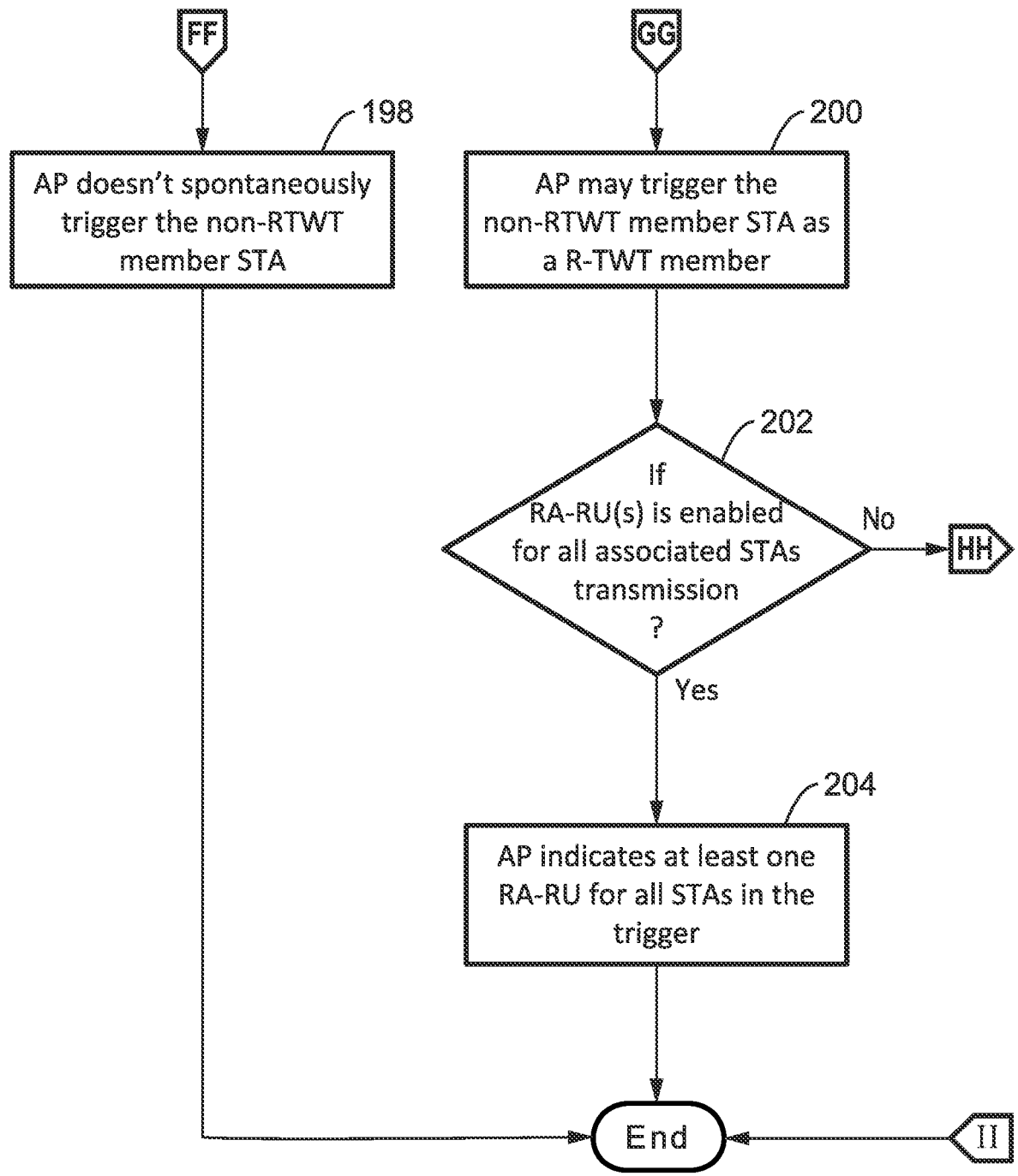
Figure 24:
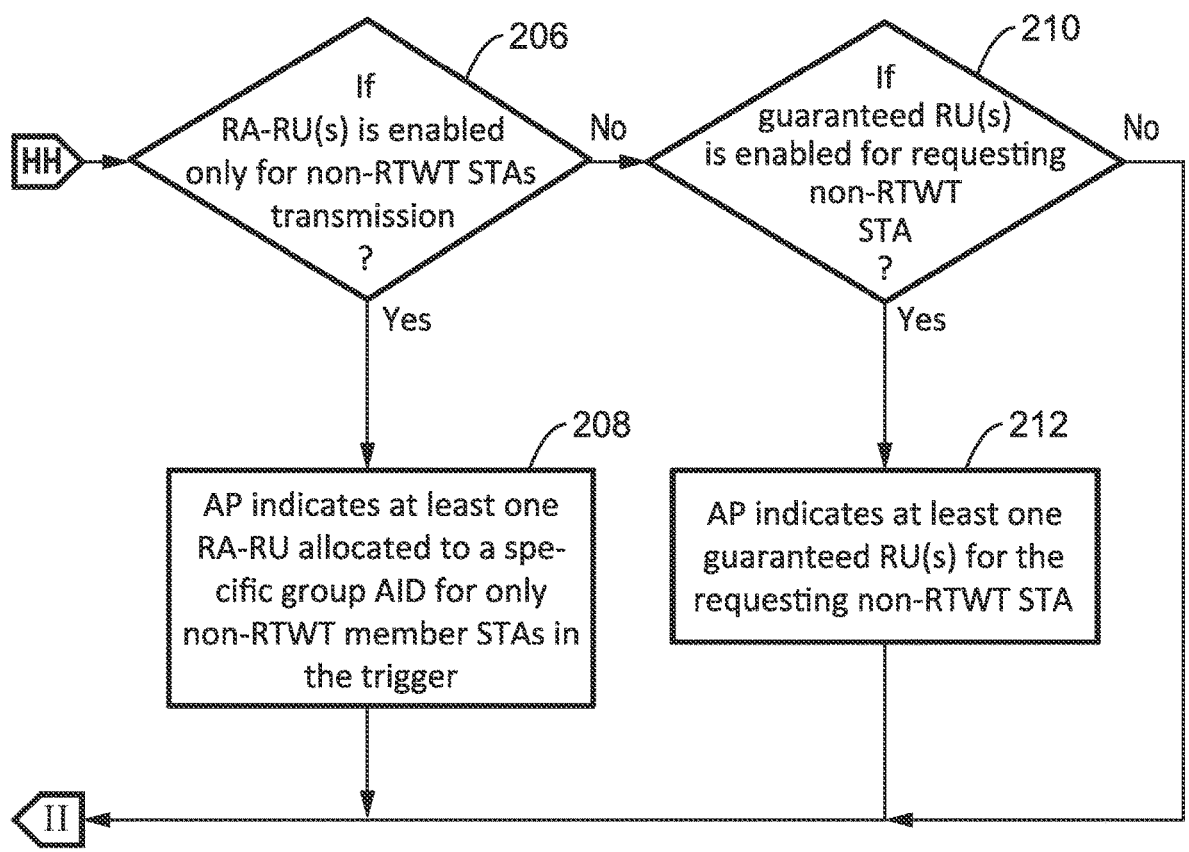

FIG. 22 through FIG. 24 illustrate an example embodiment 190 of operations by a R-TWT scheduling AP. A check at block 192 determines if the AP has received a negotiation frame to request (suggest) being added as a temporary or long-term member of the current R-TWT, or to setup a new temporary or long-term R-TWT on the transmission link.

If the condition of check 192 is not met, then execution reaches block 198 in FIG. 23 and the AP doesn't spontaneously (automatically) trigger the non-R-TWT member STA, and the process ends.

Otherwise, if check 192 is met, then at block 194 the AP responds to the requesting STA to indicate its acceptance or rejection. Then at check 196 it is determined if the AP has accepted the requesting STA as a member of the requested R-TWT on the specified transmission link. If it has not, then execution moves to block 198 in FIG. 23 as already described.

Otherwise, execution moves to block 200 in FIG. 23 and the AP may trigger the non-R-TWT member station as a R-TWT member. Then at check 202 it is determined if RA-RU(s) are enabled for all associated STA transmissions. If the condition is met, then at block 204 the AP indicates at least one RA-RU for the STAs in the trigger and the process ends.

Otherwise, if the condition of check 202 is not met, then at check 206 in FIG. 24, it is determined if the RA-RU(s) have been enabled for only non-R-TWT STA transmissions. If that condition is met, then at block 208 the AP indicates at least one RA-RU allocated to a specific group AID for only non-R-TWT member STAs in the trigger, and the process ends.

If the above condition is not met, then check 210 is performed to determine if guaranteed RU(s) are enabled for the requesting non-R-TWT STA. If the condition is not met, then the process ends. Otherwise, block 212 is executed and the AP indicates that there is at least one guaranteed RU(s) for the requesting non-R-TWT STA.

4.10. New Fields and Frames

FIG. 25 illustrates an example embodiment 230 of a Temporary Member subfield in a Request Type field in the Broadcast TWT parameter Set field for R-TWT. A new subfield in the Request Type field of the Broadcast TWT parameter Set field is used by a non-AP STA to request being added as a new member of the current R-TWT SP. It can also be used by the scheduling AP to indicate accepting the request, or assigning the requested STA a new R-TWT membership of current R-TWT.

This new field is inside the TWT element, which is carried by the negotiation frames (e.g., TWT request and TWT response) exchanged between the scheduling AP and the scheduled non-AP STA, which has requested to be a temporary member or a long-term member of a R-TWT SP.

This new proposed field (i.e., Temporary Member) may have two stages to indicates a temporary membership (e.g., stage 0) or a long-term membership (e.g., stage 1) as requested by the scheduled STA, or that is assigned by the scheduling AP.

The scheduled STA that is assigned a temporary membership of the current R-TWT SP is given a one time R-TWT membership in the current R-TWT SP, in which it should have the same priority as the original members of the current R-TWT SP.

The scheduling AP that agreed to assign long-term membership to the requesting scheduled STA for using a specific R-TWT SP should maintain the membership for the requesting non-AP scheduled STA for using this R-TWT SP (identified by for example a Broadcast TWT ID) until this non-AP STA does a teardown of the R-TWT agreement.

All other subfields in the Request Type field in the Broadcast TWT parameter Set field are the same as that introduced in FIG. 4.

FIG. 26 illustrates an example embodiment 250 of the R-TWT Information frame format with a Temporary Member subfield for R-TWT. STAs that have urgent burst Upload (UL) flow to transmit, but are not members of the current R-TWT SP can initiate a R-TWT information frame exchange with the scheduling AP. The non-R-TWT member STA can request setting up a new (temporarily or longer term) R-TWT SP after the current R-TWT SP and this shall be earlier than its own R-TWT SP.

Upon receiving the R-TWT information frame from the non-AP STA, the scheduling AP may respond with a frame that carries the same fields as the R-TWT information frame to indicate the Next TWT start time and if the new R-TWT SP is a temporary or long-term SP for the scheduled STA which requested this setup.

The fields preceding the new "Temporary R-TWT" subfield are the same as those in the TWT Information frame as introduced in FIG. 8, which should maintain the flexible TWT feature as defined in IEEE802.11ax_D8.0.

The Temporary R-TWT field indicates that the new R-TWT SP is temporarily setup for only one time (if set for example to 1 stage) or is setup for a long term (set as for example 0 stages), which need to be torn down by the scheduled STA which initiates this setup.

The fields after the "Temporary R-TWT" are the same as those in the Restricted TWT Traffic Info field as introduced in FIG. 6, which indicates the TWT traffic information that has been requested/accepted in the new R-TWT SP.

The non-AP STA which initiated the R-TWT information frame, exchanges and receives the agreement from the scheduling AP, and can use the new temporary/long-term R-TWT SP to transmit the prioritized burst UL flow.

Figure 27:
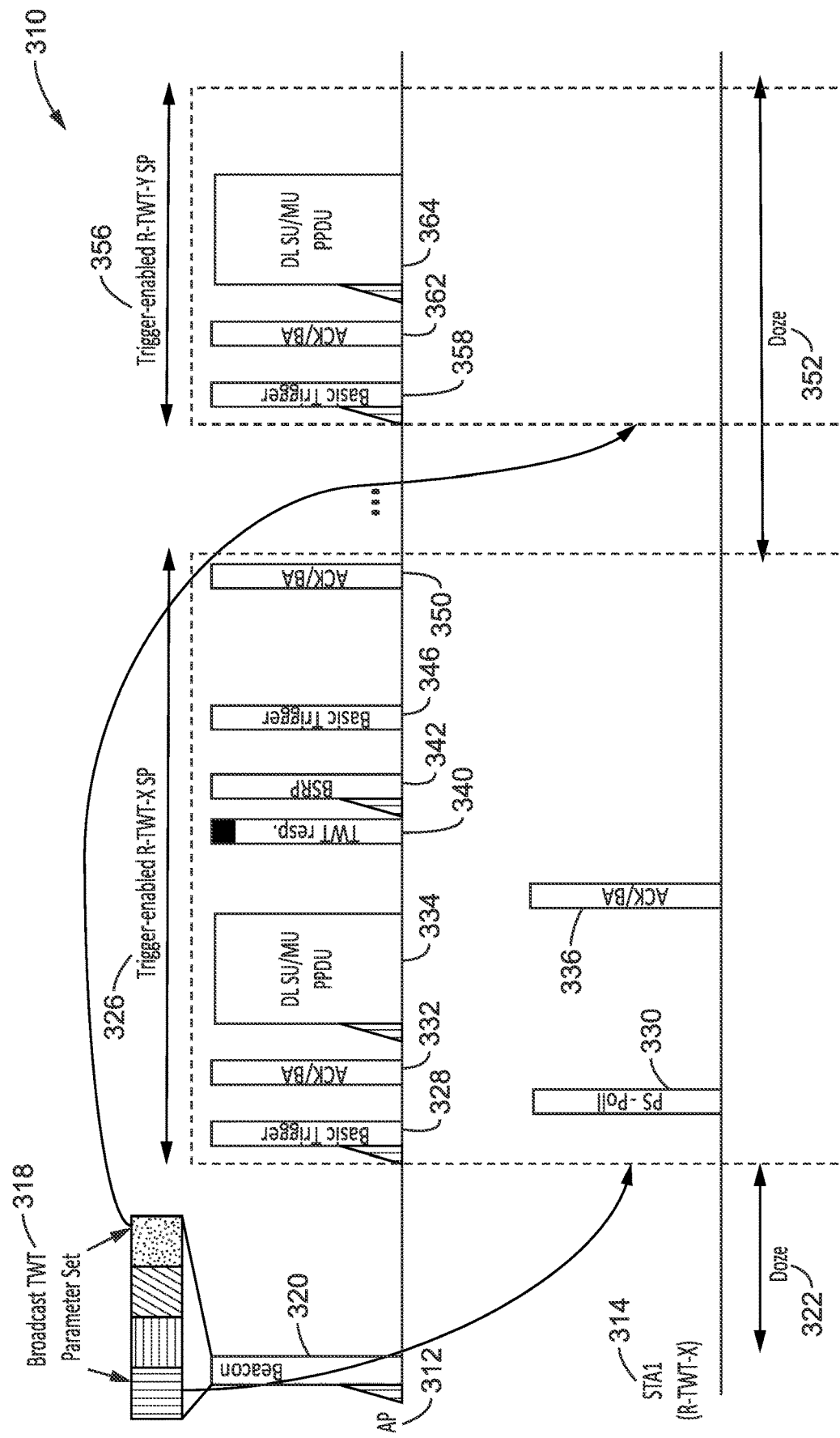
FIG. 27 and FIG. 28 is a communications diagram of a process for performing an Urgent R-TWT membership for a non-R-TWT member STA during a R-TWT SP, according to at least one embodiment of the present disclosure.
Figure 28:
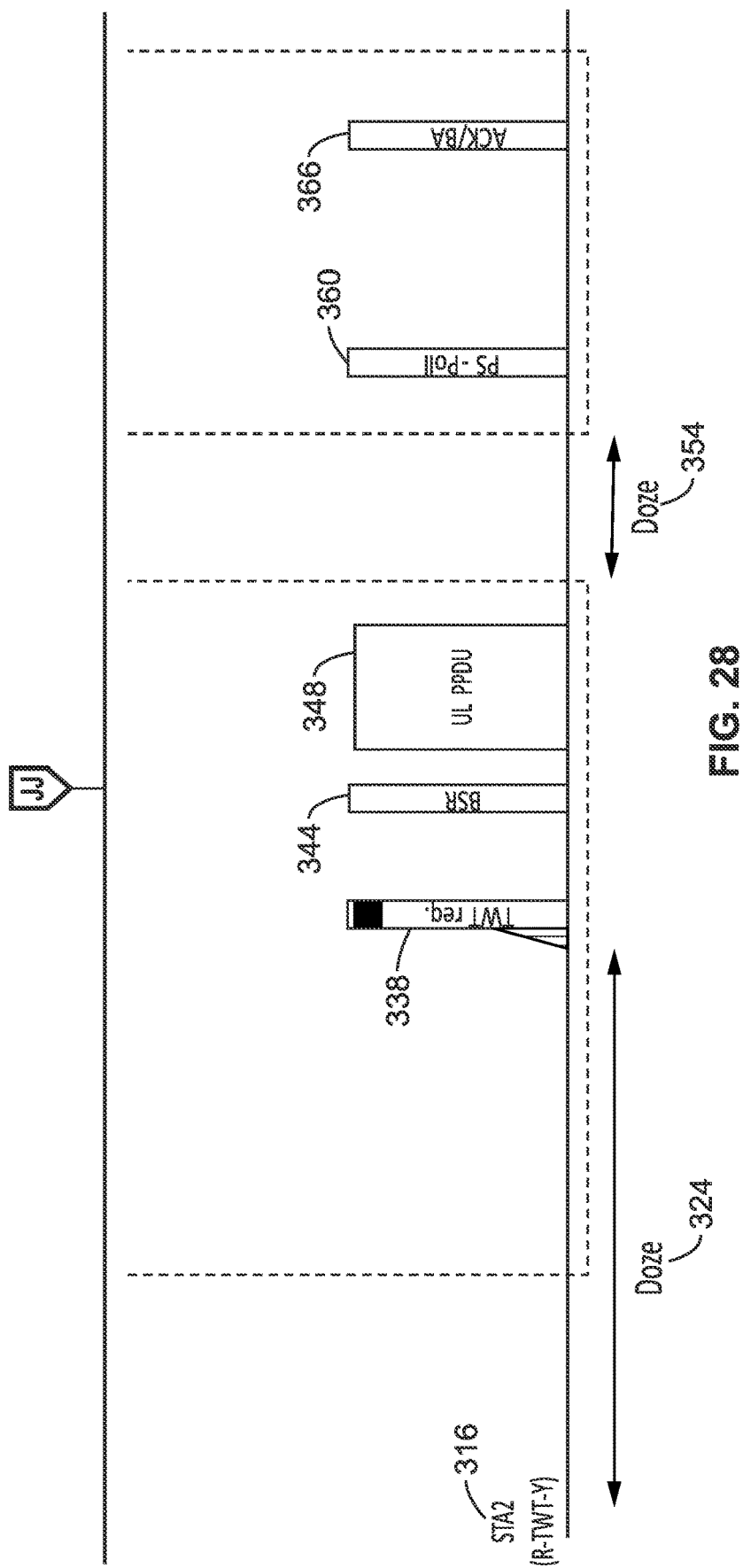

4.11. Operational Examples 4.11.1. Urgent (Temporary/Permanent) R-TWT Membership Setup Inside Current R-TWT SP FIG. 27 and FIG. 28 illustrate an example embodiment 310 of a process for performing an Urgent R-TWT membership for a non-R-TWT member STA during a R-TWT SP. Interactions are seen between the AP 312, STA1 314 and STA2 316.

The AP broadcasts Beacon frame(s) 320 that contain different Broadcast TWT Parameter Sets 318 to set up different R-TWT SPs which are identified by the Broadcast TWT IDs, for instance R-TWT-X SP and R-TWT-Y SP.

Both the R-TWT-X SP and R-TWT-Y SP in this example are scheduled as Trigger-enabled R-TWT SPs. STA1 is a member of R-TWT-X SP only; while STA2 is a member of R-TWT-Y SP only. Both STA1 and STA2 are Power Saving (PS) STAs that wake to receive the Beacon frame(s) to determine the R-TWT. When there are no communications, these STAs may be dozing 322, 324, such as seen at the beginning of the figure and after receiving Beacon frames from the scheduling AP.

During the trigger-enabled TWT SPs 326 and 356, the AP first sends a Basic Trigger frame 328 to which STA1 and STA2 indicate that they are awake during the TWT SP. STA1 and STA2 shall wake up for receiving DL PPDUs in the scheduled R-TWT SP, of which it has R-TWT membership, and may go to a doze state outside their R-TWT SP.

In R-TWT-X SP the following is shown. STA1, as a member of the R-TWT-X SP, responds to the Basic Trigger frame with a PS-Poll 330 to indicate that it is awake, and receives an ACK/BA 332 from the AP. STA2 does not respond to the Basic Trigger frame, which indicates that it is still dozing.

STA1 receives its DL PPDUs 334, and is seen responding with an ACK/BA 336. After this exchange STA1 goes to a doze state 352 outside of this R-TWT-X SP.

STA2, as a non-member of the R-TWT-X SP, is shown waking with an urgent UL RTA flow to transmit, which make STA2 change from doze status to wake up status. STA2 is shown initiating a R-TWT negotiation request 338 with the scheduling AP by sending a negotiation frame (e.g., TWT request) that carries the TWT element.

The TWT setup command subfield in the Broadcast TWT parameter set field should be set as "Request TWT" or "Suggest TWT" to leave the decision to the scheduling AP.

The Requesting/Suggesting non-AP STA shall indicate its request to be a temporary or a long-term member of the requested R-TWT-X SP by indicating this in the new Temporary Member subfield in the Request Type field in Broadcast TWT parameter Set field as described for FIG. 25.

If the scheduling AP agrees to the requested/suggested TWT parameter set, then it should respond with a TWT response frame 340 having a TWT setup command field set as "Accept TWT" and indicates the agreed period of the membership (i.e., temporary or long-term) in the new proposed Temporary Member subfield in the Request Type field in Broadcast TWT parameter Set field as described for FIG. 25.

The scheduling AP may send a BSRP frame 342 to STA2 to trigger BSR frame 344 and use the BSR information to allocate RUs to STA2 for transmitting UL TB PPDUs. The allocation of RU information for STA2 is carried in the Basic Trigger frame 346. Upon receiving the Basic Trigger frame, STA2 shall transmit UL Trigger-Based (TB) PPDU (s) 348 using the allocated RUs. The scheduling AP should response with an ACK/BA 350 after receiving the PPDU(s) from STA2. STA2 is then seen returning to a doze state 354.

In the R-TWT-Y SP the following is shown:

STA2, as a member of the R-TWT-Y SP 356, awakes and responds to the Basic Trigger frame 358 from the scheduling AP with a PS-Poll 360 to indicate that it is awake, and is sent ACK/BA 362 by the AP. It will be noted that STA1 does not respond to the Basic Trigger frame, which is an indication that it is asleep (dozing) 352.

STA2 receives its DL PPDUs 364, and responds with an ACK/BA 366 in a subsequent exchange with the AP and then may return to a doze state outside this R-TWT-Y SP.

4.11.2. Urgent New R-TWT SP Setup During Current R-TWT SP

Figure 29:
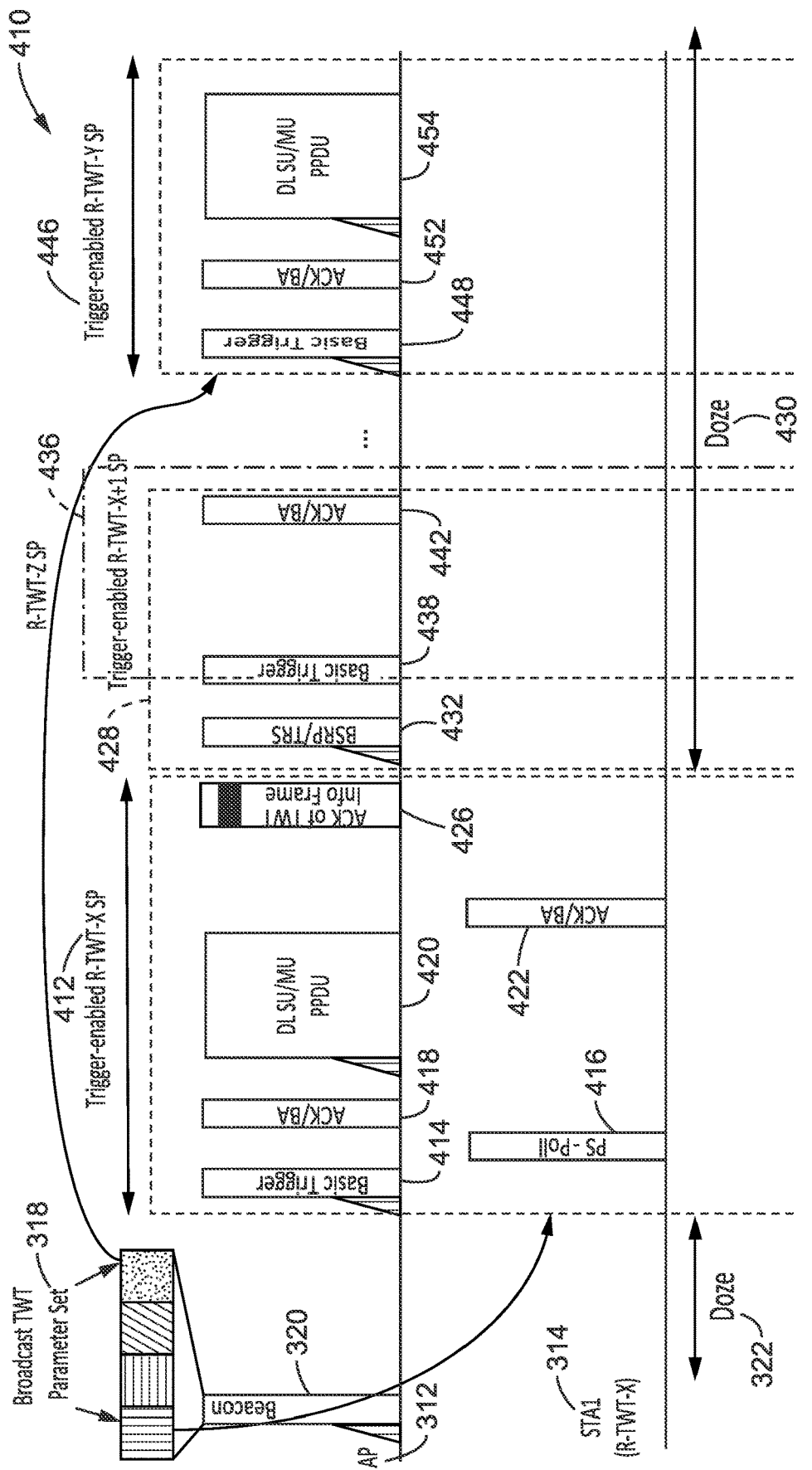
FIG. 29 and FIG. 30 are a communications diagram of a setup procedure for a new R-TWT SP for a non-R-TWT member STA during an ongoing R-TWT SP, according to at least one embodiment of the present disclosure.
Figure 30:
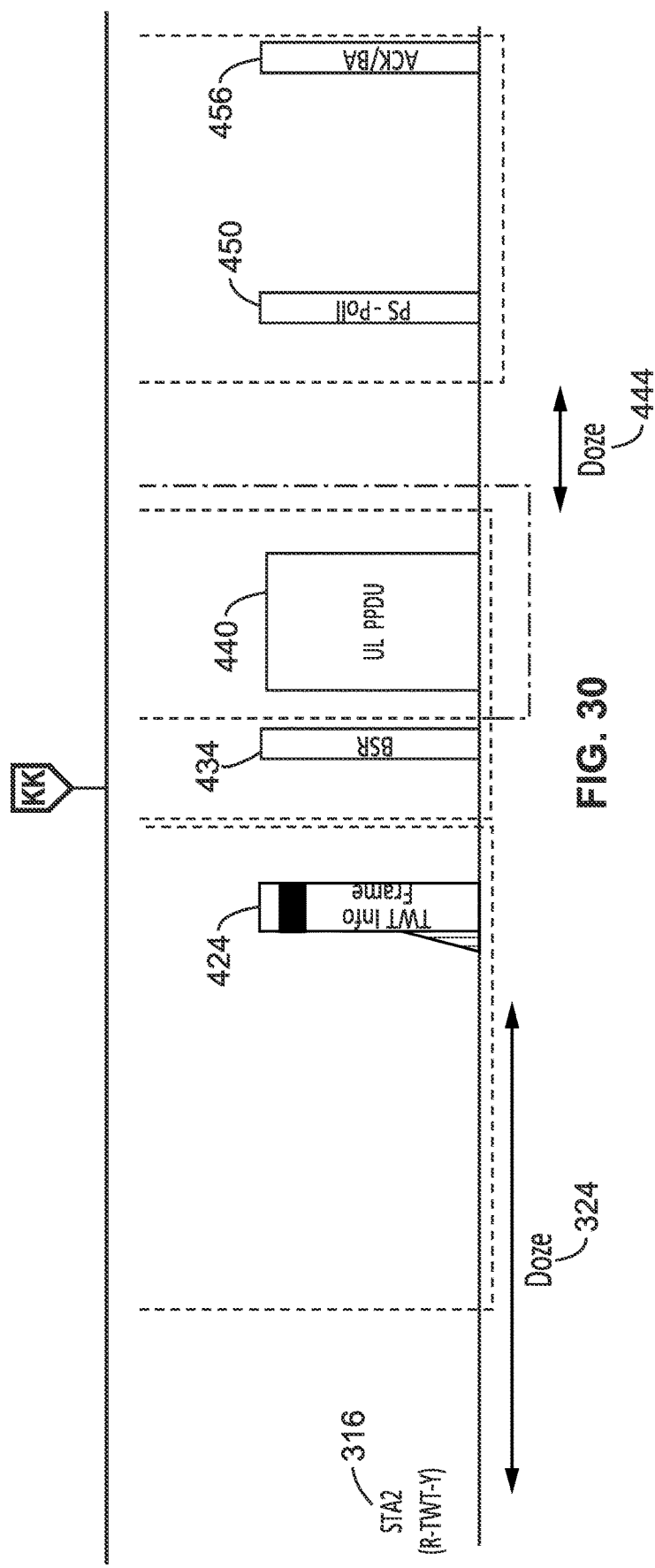

FIG. 29 and FIG. 30 illustrates an example embodiment 410 of a setup procedure for a new R-TWT SP for a non-R-TWT member STA during an ongoing R-TWT SP. Interactions are again seen between the AP 312, STA1 314 and STA2 316.

The AP broadcast Beacon frame(s) 320 contains different Broadcast TWT Parameter Sets 318 to set up different R-TWT SPs which are identified by the Broadcast TWT IDs (e.g., R-TWT-X SP, R-TWT-Y SP and R-TWT-Z SP).

Both R-TWT-X SP 412 and R-TWT-Y SP 446, in this example are scheduled as Trigger-enabled R-TWT SPs. R-TWT-Z SP 436 is not a Trigger-enabled R-TWT SP.

STA1 is a member of R-TWT-X SP only; while STA2 is a member of R-TWT-Y SP only. Both STA1 and STA2 are Power Saving (PS) STAs that wake to receive the Beacon frame(s) to determine the R-TWT and may be dozing after receiving Beacon frames from the scheduling AP.

During the trigger-enabled TWT SPs, the AP first sends a Basic Trigger frame 414 and 438 to which STA1 and STA2 indicate that they are awake during the TWT SP.

STA1 and STA2 shall wake up for receiving DL PPDUs in the scheduled R-TWT SP, of which it has an R-TWT membership, and returns to a dozing state outside their R-TWT SPs.

In the R-TWT-X SP:

STA1, as a member of the R-TWT-X SP, responds to Basic Trigger frame 414 with a PS-Poll 416 to indicate that it is awake. STA2 does not respond to the Basic Trigger frame, which indicates that it is dozing.

STA1 receives its DL buffered units (BUs) 420, depicted with DL SU/MU PPDU(s), and responds with an ACK/BA 422. After R-TWT-X SP STA1 may return/go to a dozing state 430.

STA2, as a non-member of the R-TWT-X SP, is shown having an urgent UL RTA flow to transmit, whereby STA2 changes from doze state to the wake up state. STA2 is seen sending a R-TWT Information frame 424 to the scheduling AP to request/suggest that the scheduling AP setup a new (temporary/long-term) R-TWT SP after the current R-TWT-X SP and before its own R-TWT-Y SP.

The R-TWT Information frame should set the Response Request field and the Next TWT Request field to zero to indicate the response does not need to be an R-TWT Information frame. The Requesting/Suggesting non-AP STA should indicate if a temporary or a long-term R-TWT SP is needed by indicating this in the Temporary R-TWT field in the R-TWT Information frame as defined in FIG. 26.

Upon receiving the R-TWT Information frame from the non-AP STA, the scheduling AP responds with a frame 426 carrying the fields as contained in the R-TWT Information frame and sets the Next TWT to the earliest time to start a new R-TWT SP. The Response Request field and the Next TWT Request field should be set to zero.

The scheduling AP should indicate if a temporary or a long-term R-TWT SP is agreed upon in this setup by indicating this in the Temporary R-TWT field in the R-TWT Information frame as defined in FIG. 26.

In the new (temporary or long-term) R-TWT-X+1 SP 428 the following is shown. This SP is seen partially overlapping the existing R-TWT-Z SP in the time domain. In this case, although STA2 does not have an R-TWT membership of R-TWT-Z, it should still have a high access priority as an R-TWT member during all R-TWT-X+1 SP.

During R-TWT-X+1 SP, the scheduling AP may send a Buffer Status Report Poll (BSRP)/Triggered Response Scheduling (TRS) frame 432 to STA2 to trigger BSR frame 434, wherein the AP can utilize the BSR information to allocate RUs to STA2 for transmitting UL TB PPDUs. The allocation of RUs for STA2 is carried in the Basic Trigger frame 438. Upon receiving the Basic Trigger frame, STA2 shall transmit UL TB PPDU 440 using the allocated RUs. The scheduling AP should respond with ACK/BA 442 after receiving the PPDU(s) from STA2. STA2 may return to a dozing state 444 after this R-TWT-X+1 SP.

In the R-TWT-Y SP:

STA2, as a member of the R-TWT-Y SP responds to a Basic Trigger frame 448 from the scheduling AP with a PS-Poll 450 to indicate that it is awake, to which the AP sends ACK/BA 452. STA1, however, does not respond to the Basic Trigger frame, which indicates that it is dozing.

STA2 receives its DL BUs (e.g., DL SU/MU PPDU) 454 in an exchange with the AP, and responds with ACK/BA 456. STA2 may return to a dozing state outside this R-TWT-Y SP.

4.11.3. Urgent Non-R-TWT Member STA Transmission Using UORA

The following examples are based on the new implementation described in Section 4.5.

Figure 31:
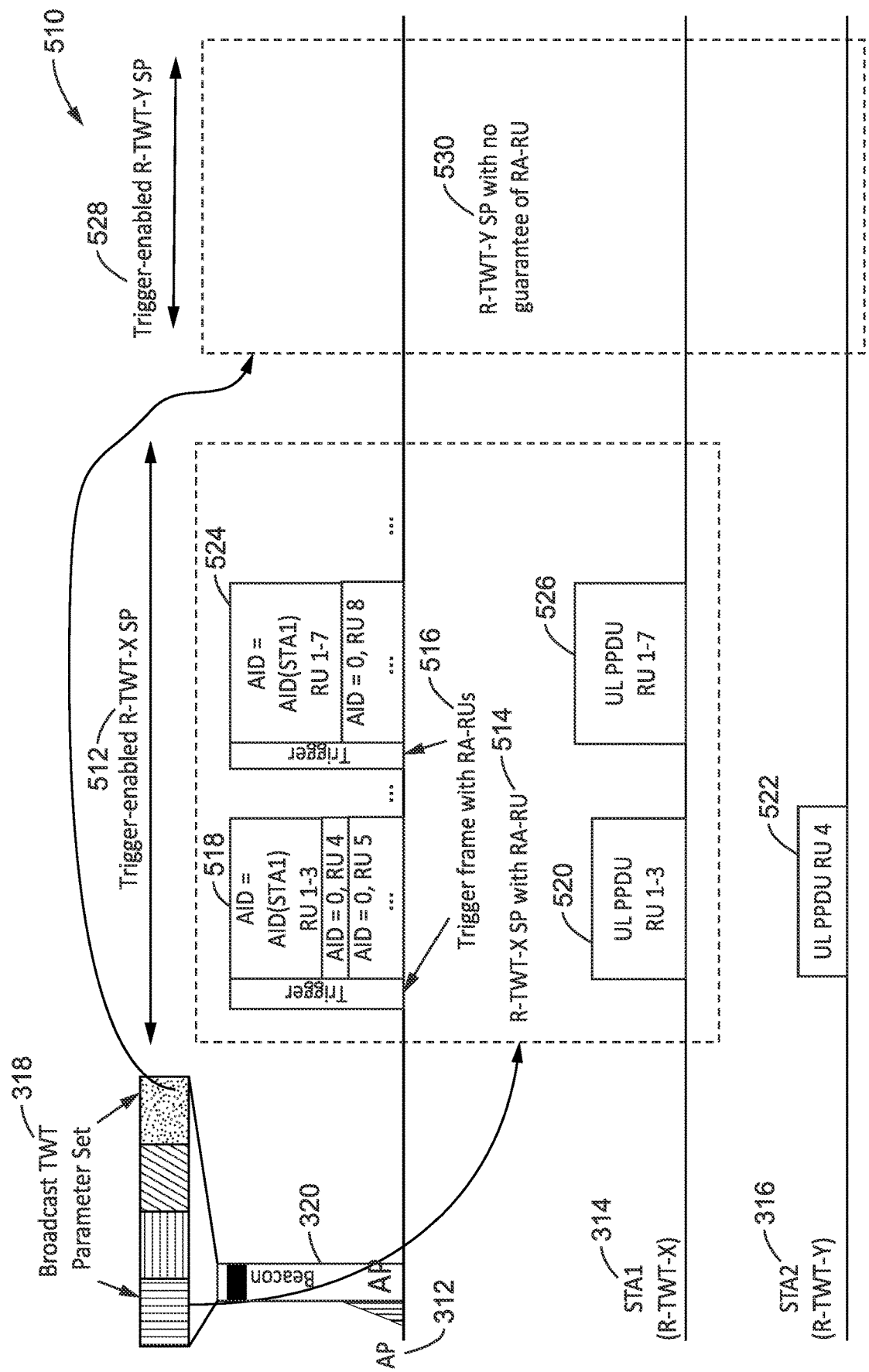
FIG. 31 is a communications diagram of a non-R-TWT member STA transmitting using UORA in a R-TWT SP, of which it does not have membership, according to at least one embodiment of the present disclosure.

FIG. 31 illustrates an example embodiment 510 of a non-R-TWT member STA transmitting using UORA in a R-TWT SP, of which it doesn't have membership. The STAs and AP shown are the same as in the previous two figures.

The AP broadcasts a Beacon frame(s) 320 that contains different Broadcast TWT Parameter Sets 318 to set up different R-TWT SP. For example, R-TWT-X SP is shown set with Broadcast TWT Recommendation field having a value of "5" to indicate that UORA is enabled in R-TWT-X SP 512, and in R-TWT-Y SP 528 with the Broadcast TWT Recommendation field set to a value of "4" to indicate it is an original R-TWT-Y SP.

STA1 is a member of R-TWT-X SP only; while STA2 is only a member of R-TWT-Y SP.

In R-TWT-X SP 512, the scheduling AP may broadcast Trigger frames 518 and 524, with RA-RUs 516 (e.g., as the first two Trigger frames shown in this figure.

Upon receiving the first Trigger frame, STA1, as a member of R-TWT-X SP, does not need to contend for RA-RUs 514 and instead transmits its pending PPDUs 520 on the allocated RUs (e.g., RU1 through RU3) as indicated in the Trigger frame. STA2, as a non-R-TWT-X member STA, can decrement its OBO counter to contend for the eligible RA-RUs (e.g., RU 4, 5) as indicated in the Trigger frame. In this example, the OBO counter of STA2 counts down to zero after receiving the first Trigger frame, STA2 selects RU4 from the eligible RA-RUs to transmit a UL PPDU 522. The AP should respond with an ACK/BA (not shown) as a reception of the UL PPDUs.

Upon receiving the second Trigger frame 524, STA1, as a member of R-TWT-X SP, does not contend for RA-RUs and instead transmits its pending PPDUs 526 on the allocated RUs (e.g., RU1-7) as indicated in the Trigger frame. STA2, as a non-R-TWT-X member STA, can decrement its OBO counter to contend for the eligible RA-RUs (e.g., RU 8) as indicated in the Trigger frame. In this example, the OBO counter of STA2 decrements to a non-terminal (non-zero) value after receiving the first Trigger frame, and STA2 maintains the OBO value and resumes counting down until it receives a Trigger frame at a later time carrying RA-RUs for associated STAs.

In R-TWT-Y SP 528, UORA is not allowed 530. When a non-R-TWT-Y member STA (e.g., STA1) has burst UL traffic to transmit, it may need to obtain a temporary or a long-term membership of R-TWT-Y first as described in Section 4.3 and 4.4.

Figure 32:
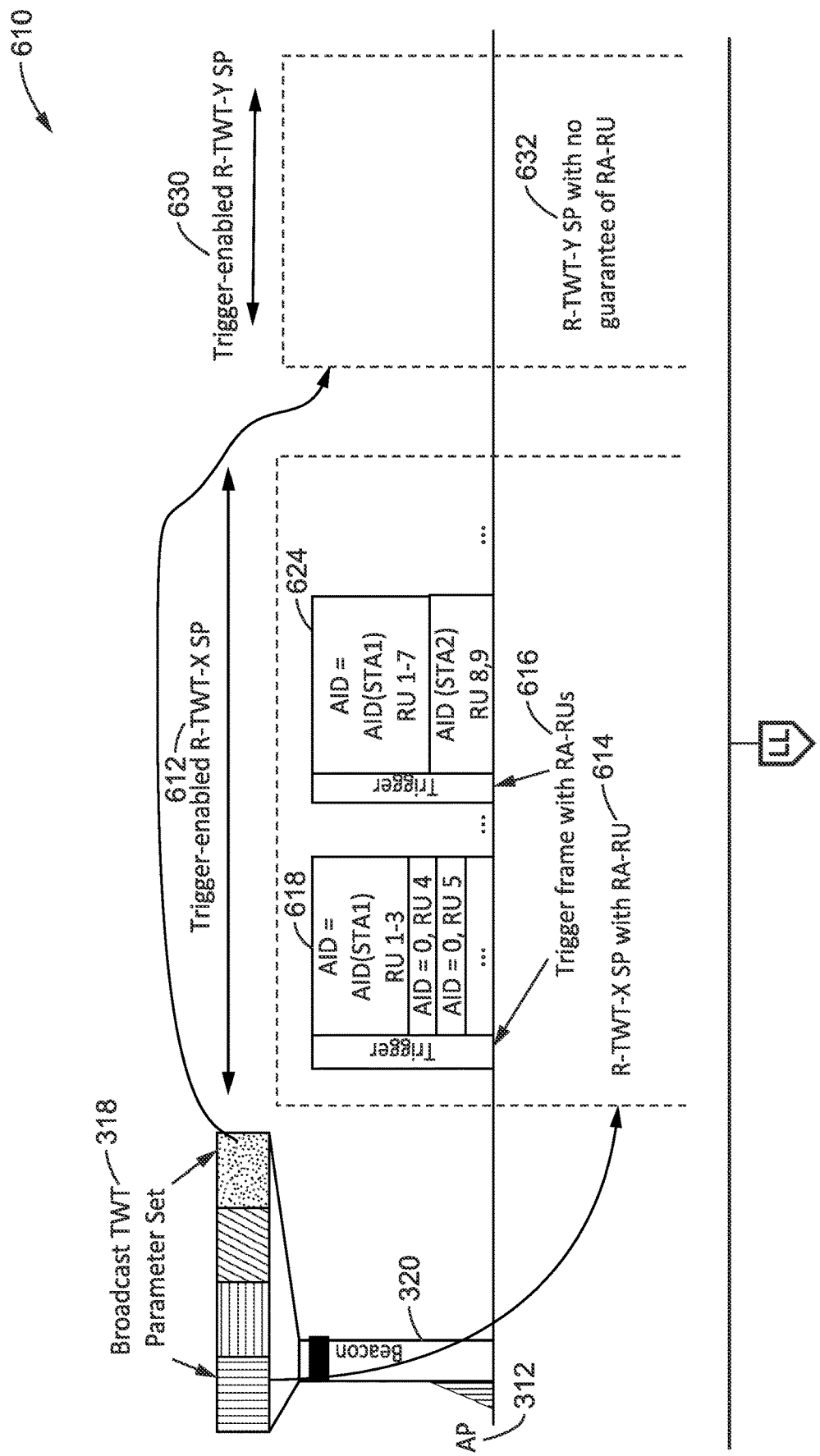
FIG. 32 and FIG. 33 are a communications diagram of a non-R-TWT member STA transmitting BSR using RA-RU in a R-TWT SP in which it does not have membership, according to at least one embodiment of the present disclosure.
Figure 33:
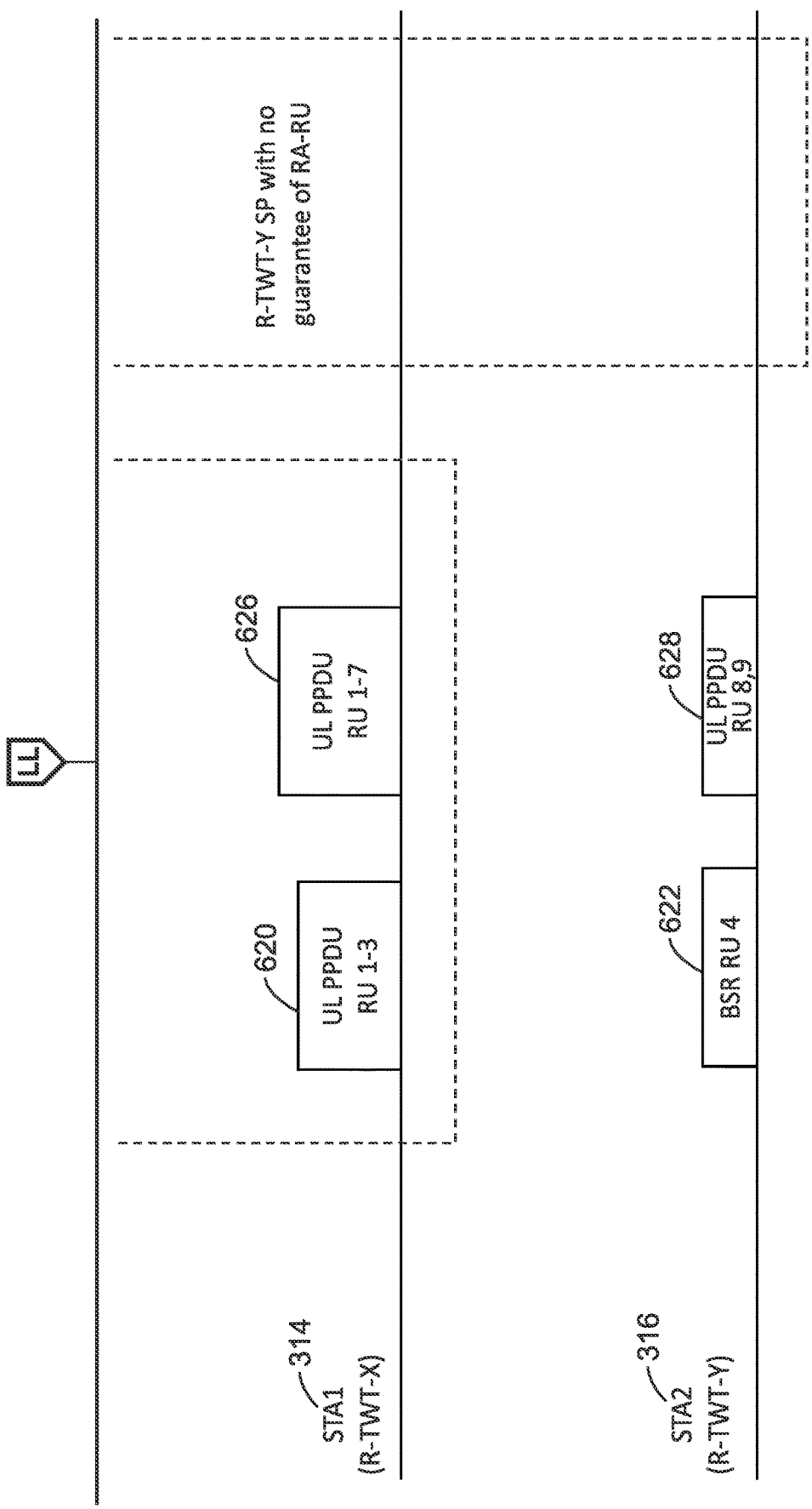

FIG. 32 and FIG. 33 illustrates an example embodiment 610 of a non-R-TWT member STA transmitting BSR using RA-RU in a R-TWT SP in which it does not have membership. The STAs and AP are the same as described in the previous figure, and otherwise this example is similar, with differences described below.

A beacon 320 is sent with broadcast TWT parameter set 318 defining an R-TWT-X SP with RA-RU 614 and describing a trigger-enabled R-TWT-Y SP 630, with no guarantee 632 of RA-RU.

Within the trigger enabled R-TWT-X SP 612, since STA1 is a member, when STA1 receives the first and the second trigger frames (618 and 624), it is seen sending UL PPDUs 620 and 626 on the assigned RUs (e.g., first PPDU on RU1 through RU3, and second PPDU on RU1 through RU7), respectively.

STA2 upon receiving this first Trigger frame 618, responds as a non-R-TWT-X member STA, by decrementing its OBO counter to contend for the eligible RA-RUs (e.g., RU4 and RU5) as indicated in the Trigger frame. In this example, the OBO counter of STA2 counts down to a terminal count (zero) after receiving this first Trigger frame, and STA2 selects RU4 from the eligible RA-RUs to transmit a BSR 622. The AP should allocate RUs to STA2 in the next Trigger frame based on the buffer status information indicated in the BSR.

Upon receiving the second Trigger frame 624, STA2, has been assigned RUs (e.g., RU8 and RU9), and it should be able to directly transmit UL PPDU(s) 628 using the assigned RUs without contending for the eligible RA-RUs.

Figure 34:
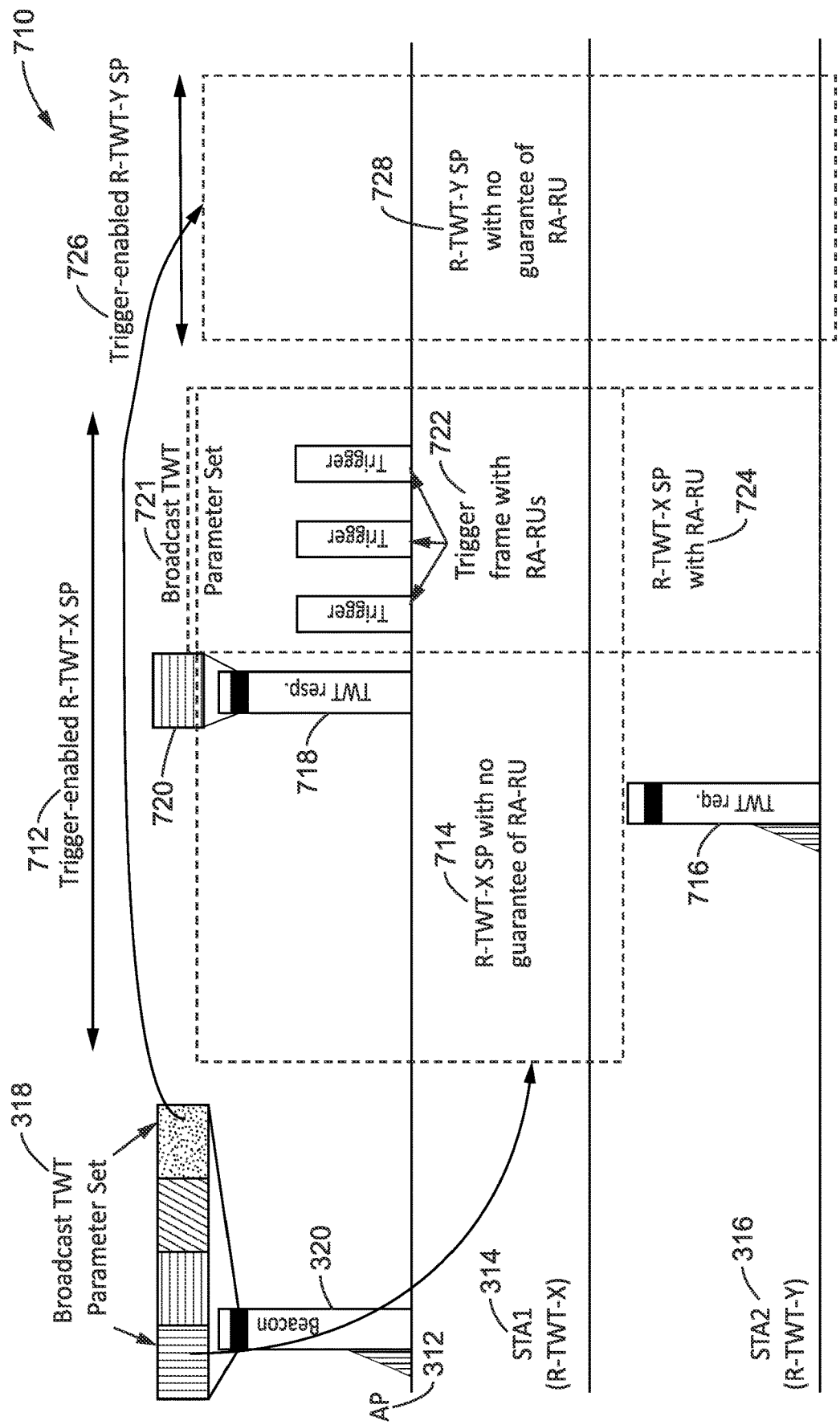
FIG. 34 is a communications diagram of a non-R-TWT member STA performing an initiation to use UORA during a R-TWT SP in which it does not have membership, according to at least one embodiment of the present disclosure.

FIG. 34 illustrates an example embodiment 710 of a non-R-TWT member STA performing an initialization to use UORA during a R-TWT SP in which it does not have membership. The STAs and AP are the same as described in the previous figure.

The AP broadcasts Beacon frame(s) 320 that contains different Broadcast TWT Parameter Sets 318 to set up different R-TWT SPs (e.g., R-TWT-X SP 712 and R-TWT-Y SP 726). Both R-TWT SPs in this example are setup with Broadcast TWT Recommendation field set with a value of "4", which indicates only R-TWT without UORA. STA1 is a member of R-TWT-X SP only; while STA2 is a member of R-TWT-Y SP only.

In R-TWT-X SP 712, the scheduling AP broadcasts Trigger frames without a guarantee of RA-RUs 714. Thus, only the triggered non-AP STAs can transmit TB UL PPDUs using the allocated RUs as indicated in each Trigger frame.

When a non-R-TWT-X member STA (e.g., STA2) has a burst of RTA traffic to transmit, it attempts to establish a R-TWT agreement with the scheduling AP during R-TWT-X SP to request that the scheduling AP initiate UORA in the R-TWT-X SP temporarily or for a long-term setup.

The non-R-TWT-X member STA2 initiates the setup in this example by transmitting a TWT setup request frame 716, and with the Broadcast TWT Recommendation field set to a value, for example "5", which indicates that the R-TWT SP is with UORA enabled and with the TWT Setup Command field set to "Request/Suggest TWT" to leave the decision to the scheduling AP.

Upon receiving the TWT request frame 716 from non-R-TWT-X member STA2, the scheduling AP responds with a TWT response 718 frame to indicate whether it accepts the new R-TWT parameters. In this example, the scheduling AP accepts the request and indicates 720 the new R-TWT parameter set in the TWT response frame with the TWT Setup command field to "Accept TWT" and the Broadcast TWT Recommendation field set to a value, exemplified as "5".

It should be noted that STA2 becomes a temporary or a long-term R-TWT-X member STA after receiving the TWT response frame from the scheduling AP and should be able to transmit TB PPDUs by accessing RA-RUs or accessing allocated RUs if the AP allocation is based on the received BSR as described in Section 4.3.

The transmission procedure in R-TWT-X SP with RA-RU is similar to the previous example of FIG. 32 and FIG. 33, except that STA2 obtains a membership in R-TWT-X SP in this example case.

After sending the TWT response 718 with its parameter set 721, the AP changes the R-TWT SP to UORA thus allowing RA-RU 724. The AP then sends trigger frames 722.

After the R-TWT-X SP ends then a trigger-enabled R-TWT-Y SP 726 is shown which has no guarantee 728 of RA-RU.

When a non-R-TWT-Y member STA (e.g., STA1) has a burst UL traffic to transmit, it may need to obtain a temporary or a long-term membership of R-TWT-Y first as described in Section 4.3 and 4.4.

4.11.4. Urgent Non-R-TWT Member STA Tx Using Unicast RU(s)

Figure 35:
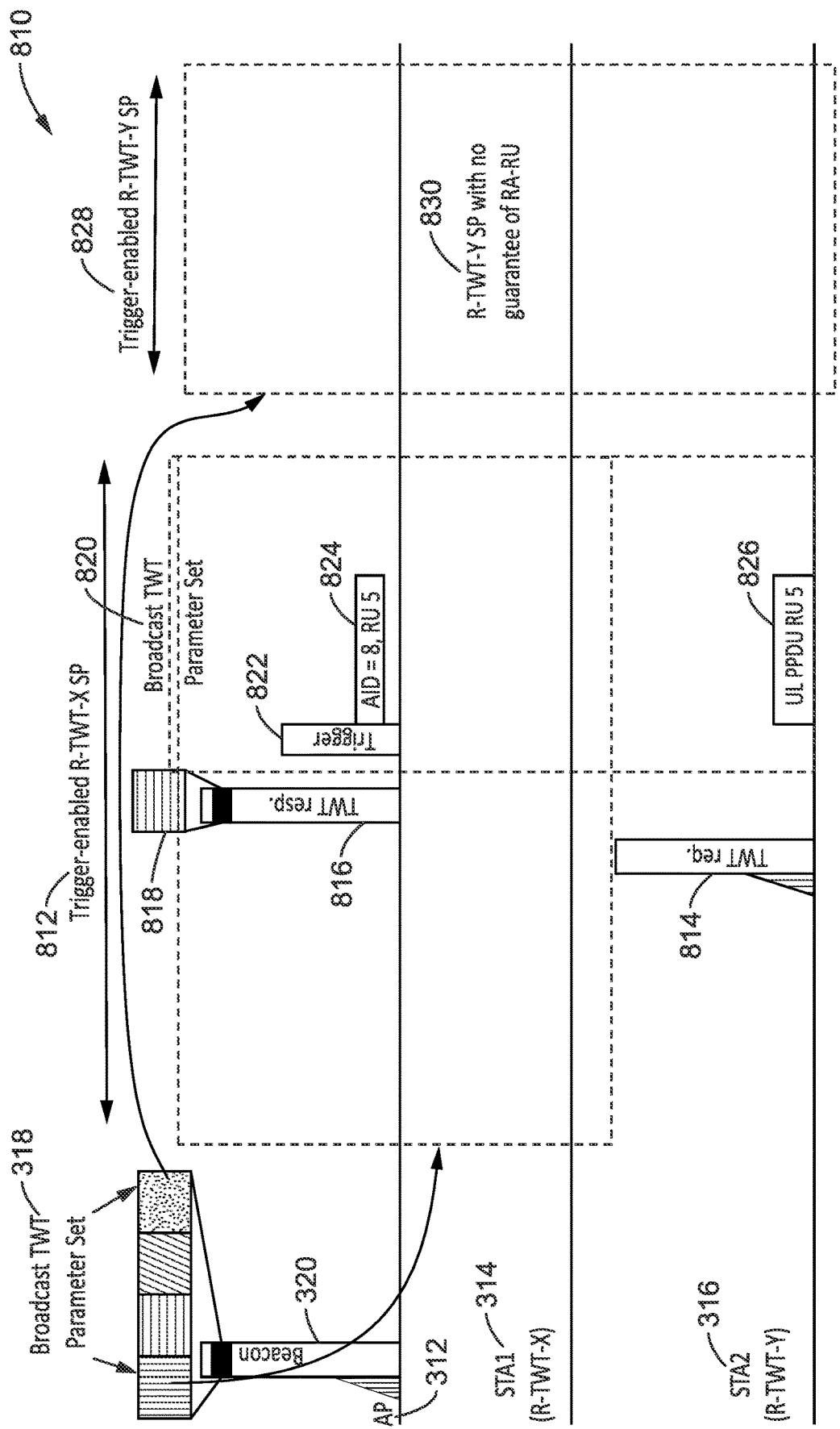
FIG. 35 is a communications diagram of a non-R-TWT member STA transmitting using unicast RU(s) in a R-TWT SP in which it does not originally have membership, according to at least one embodiment of the present disclosure.

FIG. 35 illustrates an example embodiment 810 of a non-R-TWT member STA transmitting using unicast RU(s) in a R-TWT SP in which it does not originally have membership. The AP and STAs are the same as in the prior figures.

The AP broadcast Beacon frame(s) 320 that contain different Broadcast TWT Parameter Sets 318 are used to set up different R-TWT SPs (e.g., R-TWT-X SP and R-TWT-Y SP). Both R-TWT SPs in this example are setup with a Broadcast TWT Recommendation field set to a value, exemplified as "4", which indicates that only R-TWT without unicast RU(s) is to be performed. STA1 is a member of R-TWT-X SP only; while STA2 is a member of R-TWT-Y SP only.

In R-TWT-X SP 812, the scheduling AP broadcasts Trigger frames without RA-RUs. Thus, only the triggered non-AP STAs can transmit TB UL PPDUs using the allocated RUs as indicated in each Trigger frame.

When non-R-TWT-X member STA (e.g., STA2) has a burst of RTA traffic to transmit, it is shown requesting to establish an R-TWT-X agreement with the scheduling AP during R-TWT-X SP 812 for unicast RU(s) in R-TWT-X SP as a temporally setup.

The non-R-TWT-X member STA2 may initiate the setup by transmitting a TWT setup request frame 814 with the Broadcast TWT Recommendation field set to a value, for example "6", which indicates R-TWT SP with unicast RU(s) enabled and with the TWT Setup Commend field set to "Request/Suggest TWT" to allow the scheduling AP to decide.

Upon receiving the TWT request frame from the non-R-TWT-X member, STA2, the scheduling AP responds with a TWT response frame 816 to indicate whether it accepts the new R-TWT parameter set. In this example, the scheduling AP accepts the new R-TWT parameters which are indicated 818 in the TWT response frame with the TWT Setup command field to "Accept TWT" and the Broadcast TWT Recommendation field to a value, exemplified as "6".

R-TWT-X SP 812 is changed according to the broadcast TWT parameter set 820, and the AP sends trigger 822 with RU information. STA2 transmits UL PPDU 826 on RU5, which is received 824 by the AP.

It should be noted that STA2 becomes a temporary R-TWT-X member STA after receiving the TWT response frame from the scheduling AP, and thus STA2 should be able to transmit TB PPDUs by accessing the allocated RUs (i.e., RU5).

In the next SP, which is R-TWT-Y SP 828, unicast RU(s) are not allowed 830. When a non-R-TWT-Y member STA (e.g., STA1) has a burst of UL traffic to transmit, it may first need to obtain a temporary membership in R-TWT-Y.

4.11.5. Urgent Non-R-TWT Member STA Transmission

Figure 36:
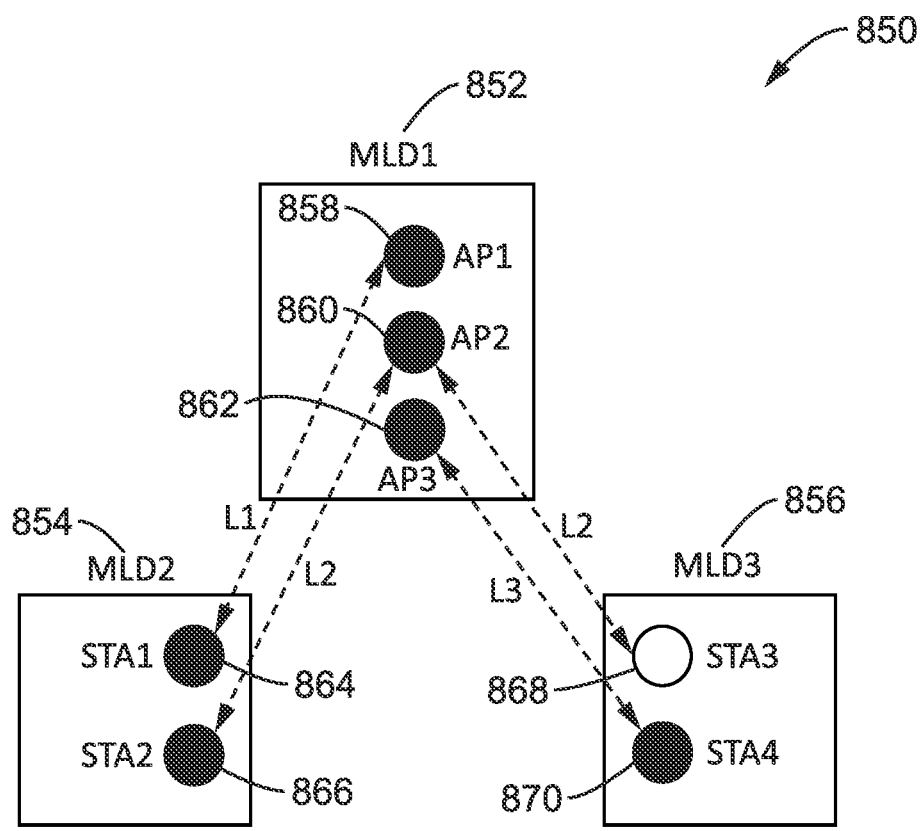
FIG. 36 is a network topology of a simple Topology of the MLO scenario, which consist of three MLDs as utilized in an example according to at least one embodiment of the present disclosure.

FIG. 36 illustrates an example embodiment 850 of a simple Topology of the MLO scenario, which consist of three MLDs. AP MLD 852 has three affiliated APs that operate on three different links, exemplified as AP1 858 on L1, AP2 860 on L2 and AP3 862 on L3.

MLD2 854 has two affiliated STAs that operate on two different links i.e., STA1 864 on L1 and STA2 866 on L2. MLD3 856 has two affiliated STAs that operate on two different links i.e., STA3 868 on L2 and STA4 870 on L3.

Figure 37:
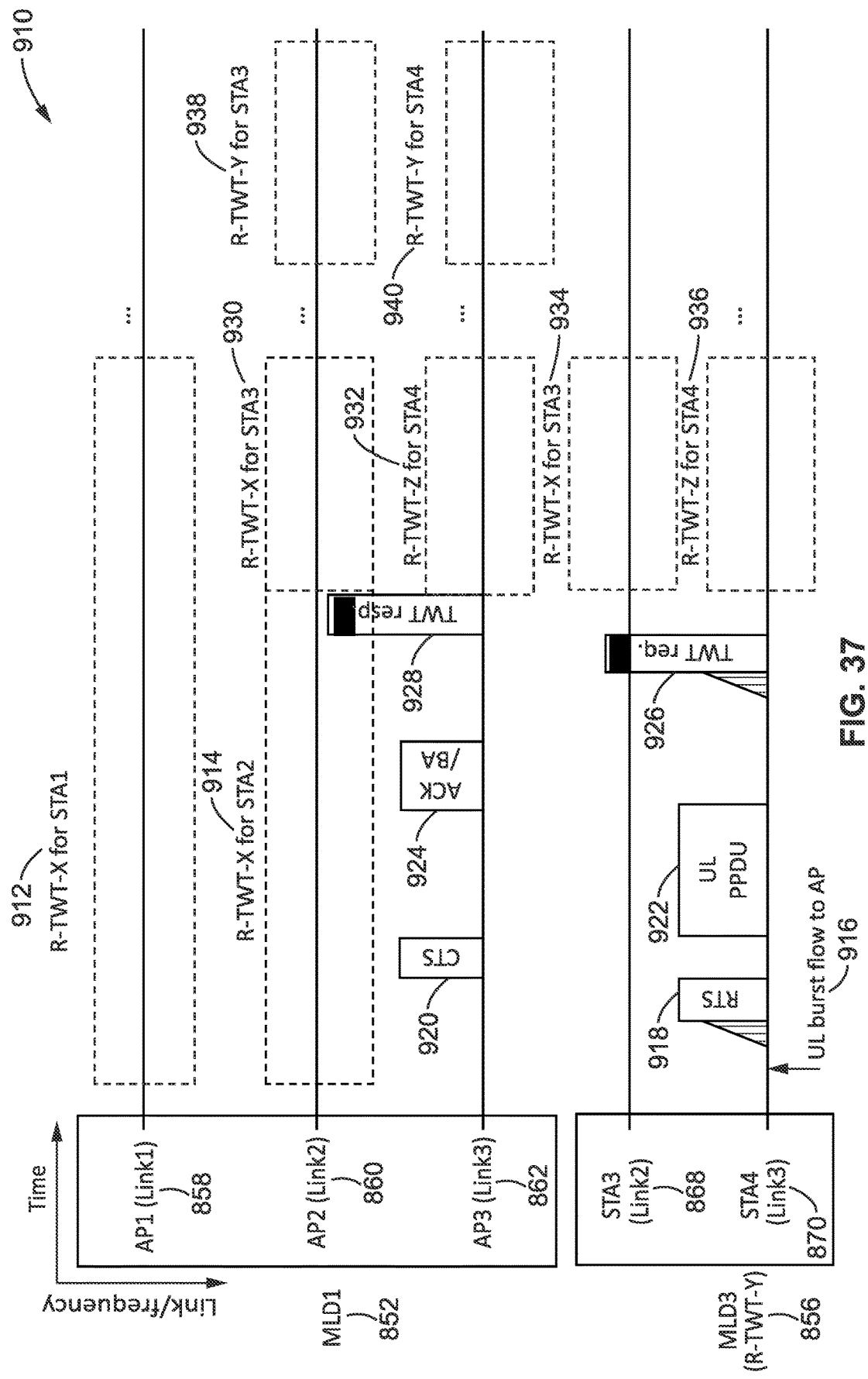
FIG. 37 is a communications diagram of an urgent R-TWT agreement setup on multiple links for a MLD STA that does not have R-TWT membership in the current R-TWT SP(s) on any link, according to at least one embodiment of the present disclosure.

FIG. 37 illustrates an example embodiment 910 of urgent R-TWT agreement setup on multiple links for a MLD STA that does not have R-TWT membership in the current R-TWT SP(s) on any link. The interacting MLDs are those seen in FIG. 36.

The scheduling MLD AP has scheduled the R-TWT-X SP for MLD2 on L1 912 and L2 914, and has scheduled the R-TWT-Y SP for MLD3 on L2 930 and 934, and on L3 932 and 936. MLD2 is not shown in the figure as it is not the focal point of this example.

The example assumes that MLD3 has urgent burst UL traffic 916 to transmit during R-TWT-X SP, in which it has not obtained membership on L1 and L3. MLD3 may use L3 to transmit the buffered packets, which shows as packets exchanges between STA4 and AP3 on L3 during the R-TWT-X SP on L1 and L2. In this case, STA4 sends a RTS 918, and receives CTS 920, then STA4 sends UL PPDU 922 and receives ACK/BA 924. Other than only using L3, MLD3 may request to be a member of current R-TWT-X SP on L2 and may request to setup a new R-TWT-Z SP on L3. It should negotiate the new R-TWT-X setup and the new R-TWT-Z setup with the MLD1 on L2 and L3, respectively by sending a R-TWT negotiation frame on any available link.

In this example, different Broadcast TWT agreements can be established on different links; for example, a R-TWT-X SP on L2 with UORA feature (as proposed in Section 4.5) and a R-TWT-Z SP on L3 with Unicast feature (as proposed in Section 4.6).

The negotiation frames (e.g., TWT request and TWT response) exchanged between STA4 and AP3 on L3. Upon receiving the TWT request frame 926 on L3, AP3 should respond with a TWT response frame 928, to announce the acceptance of the new R-TWT-X agreement on L2 and/or the new R-TWT-Z agreement on L3. After receiving the TWT response frame. STA3 from MLD3 is added as a temporary/long term member of using R-TWT-X SP 930 and 934 on L2. At the same time, STA4 from MLD3 is member of using the new R-TWT-Z SP 932 and 936 on L3.

MLD3 is a member of R-TWT-Y SP on L2 and L3, thus could access R-TWT-Y SP on L2 938 and L3 940 with the highest priority of the R-TWT member.

5. General Scope of Embodiments

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure(s) algorithm(s), step(s), operation(s), formula (e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple implementations of the technology which include, but are not limited to, the following:

An apparatus for wireless communication in a network, the apparatus comprising: (a) a wireless communication circuit, as a wireless station (STA) which is a separate STA or as a STA in a multiple-link device (MLD), and operating as either a regular STA or an Access Point (AP) STA, for wirelessly communicating with other wireless stations (STAs) using a carrier sense multiple access/collision avoidance (CSMA/CA) mechanism on a wireless local area network (WLAN) in which enhanced distributed channel access (EDCA) is utilized for random channel access on all the links; (b) a processor coupled to said wireless communication circuit for operating on the WLAN; (c) a non-transitory memory storing instructions executable by the processor for communicating with other STAs; and (d) wherein said instructions, when executed by the processor, perform steps of a wireless communications protocol for said wireless communication circuit, comprising: (d) (i) enqueuing an urgent burst of real-time application (RTA) traffic by a non-AP STA for transmission to the AP during an ongoing restricted target wake time (R-TWT) service period (SP), in which said non-AP R-TWT STA does not have an R-TWT membership; (d) (ii) initiating an R-TWT negotiation from said non-AP STA, with the AP for performing scheduling as a scheduling AP, inside the ongoing R-TWT SP, wherein said negotiation contains a request: (A) for either a temporary or a long-term membership in a specific R-TWT SP which is either the current R-TWT SP or an R-TWT SP after the currently ongoing R-TWT SP but before the R-TWT SP that the non-AP STA originally had R-TWT membership for, or (B) for contending for a random access-resource unit (RA-RU) in the current R-TWT SP if the uplink orthogonal frequency division multiple access-based random access (UORA) feature is enabled; (d) (iii) wherein said scheduling AP may accept or reject the membership request from the non-AP STA making the membership request, or it may indicate an alternate R-TWT setup or dictate a preferred R-TWT setup from the STA; and (d) (iv) wherein in response to the membership request being accepted, said non-AP STA transmits its urgent burst of RTA traffic: (A) in the specific R-TWT SP; or (B) contends for a RA-RU in the current R-TWT SP if UORA is enabled.

An apparatus for wireless communication in a network, the apparatus comprising: (a) a wireless communication circuit, as a wireless station (STA) which is a separate STA or as a STA in a multiple-link device (MLD), and operating as either a regular STA or an Access Point (AP) STA, for wirelessly communicating with other wireless stations (STAs) using a carrier sense multiple access/collision avoidance (CSMA/CA) mechanism on a wireless local area network (WLAN) in which enhanced distributed channel access (EDCA) is utilized for random channel access on all the links; (b) a processor coupled to said wireless communication circuit for operating on the WLAN; (c) a non-transitory memory storing instructions executable by the processor for communicating with other STAs; and (d) wherein said instructions, when executed by the processor, perform steps of a wireless communications protocol for said wireless communication circuit, comprising: (d) (i) enqueuing an urgent burst of real-time application (RTA) traffic by a non-AP STA for transmission to the AP during an ongoing restricted target wake time (R-TWT) service period (SP), in which said non-AP R-TWT STA does not have an R-TWT membership; (d) (ii) initiating an R-TWT negotiation from said non-AP STA, with the AP for performing scheduling as a scheduling AP, inside the ongoing R-TWT SP, wherein said negotiation contains a request: (A) for either a temporary or a long-term membership in a specific R-TWT SP which is either the current R-TWT SP or an R-TWT SP after the currently ongoing R-TWT SP but before the R-TWT SP that the non-AP STA originally had R-TWT membership for, or (B) for contending for a random access-resource unit (RA-RU) in the current R-TWT SP if the uplink orthogonal frequency division multiple access-based random access (UORA) feature is enabled; (d) (iii) wherein said R-TWT negotiation is based on said non-AP STA transmitting a TWT request frame and receiving a TWT response frame, each of these frames carrying TWT information elements comprising a negotiation type subfield which indicates this form of negotiation; (d) (iv) wherein said TWT information elements comprise a subfield of a request type field for indicating temporary or long-term membership in the current R-TWT, which can be used by said scheduling AP for indicating whether membership is accepted; (d) (v) wherein said scheduling AP may accept or reject the membership request from the non-AP STA making the membership request, or it may indicate an alternate R-TWT setup or dictate a preferred R-TWT setup from the STA; (d) (vi) wherein in response to the membership request being accepted, said non-AP STA transmits its urgent burst of RTA traffic: (A) in the specific R-TWT SP; or (B) contends for a RA-RU in the current R-TWT SP if UORA is enabled; and (d) (vii) wherein UORA may be enabled in response to setting a value in the broadcast TWT recommendation field to request enabling UORA with at least one RA-RU feature in the R-TWT.

A method of performing wireless communication in a network, the method comprising: (a) communicating between wireless stations (STAs) that are either separate STAs or STAs within a multiple-link device (MLD), and each of which operates as either an Access Point (AP), or a non-AP STA, for wirelessly communicating with other wireless STAs using a carrier sense multiple access/collision avoidance (CSMA/CA) mechanism on a wireless local area network (WLAN) in which enhanced distributed channel access (EDCA) is utilized for random channel access on all the links; (b) enqueuing an urgent burst of real-time application (RTA) traffic by a non-AP STA for transmission to the AP during an ongoing restricted target wake time (R-TWT) service period (SP), in which said non-AP R-TWT STA does not have an R-TWT membership; (c) initiating an R-TWT negotiation from said non-AP STA, with the AP for performing scheduling as a scheduling AP, inside the ongoing R-TWT SP, wherein said negotiation contains a request: (A) for either a temporary or a long-term membership in a specific R-TWT SP which is either the current R-TWT SP or an R-TWT SP after the currently ongoing R-TWT SP but before the R-TWT SP that the non-AP STA originally had R-TWT membership for, or (B) for contending for a random access-resource unit (RA-RU) in the current R-TWT SP if the uplink orthogonal frequency division multiple access-based random access (UORA) feature is enabled; (d) wherein said scheduling AP may accept or reject the membership request from the non-AP STA making the membership request, or it may indicate an alternate R-TWT setup or dictate a preferred R-TWT setup from the STA; and (e) wherein in response to the membership request being accepted, said non-AP STA transmits its urgent burst of RTA traffic: (A) in the specific R-TWT SP; or (B) contends for a RA-RU in the current R-TWT SP if UORA is enabled.

The apparatus or method of any preceding implementation, wherein said R-TWT negotiation is based on said non-AP STA transmitting a TWT request frame and receiving a TWT response frame, each of these frames carrying TWT information elements comprising a negotiation type subfield which indicates this form of negotiation.

The apparatus or method of any preceding implementation, wherein said TWT information elements are further comprising a subfield of a request type field for indicating temporary or long-term membership in the current R-TWT, which can be used by said scheduling AP for indicating whether membership is accepted.

The apparatus or method of any preceding implementation, wherein UORA may be enabled in response to setting a value in the broadcast TWT recommendation field to request enabling UORA with at least one RA-RU feature in the R-TWT.

The apparatus or method of any preceding implementation, wherein a non-AP STA which is scheduled for any R-TWT can contend for an RA-RU transmission in the current R-TWT SP if UORA is enabled.

The apparatus or method of any preceding implementation, wherein a non-AP STA which is not scheduled for any R-TWT can contend for an RA-RU transmission in the current R-TWT SP if UORA is enabled.

The apparatus or method of any preceding implementation, wherein upon its OFDMA backoff (OBO) counter reaching a terminal count, a non-AP STA, despite not being an R-TWT member STA can directly send a UL PPDU using one RA-RU or can send a buffer status report (BSR) in the RA-RU to allow said scheduling AP to allocate specific RUs to it for performing directly access in the next triggered UL PPDU transmission.

The apparatus or method of any preceding implementation, wherein the non-AP STA which is an R-TWT scheduled STA requests to join the current R-TWT SP using a guaranteed unicast RU allocated to a specific association identification (AID) owned by it.

The apparatus or method of any preceding implementation, wherein a value of the broadcast TWT recommendation field indicates a request for said guaranteed unicast RU allocation.

The apparatus or method of any preceding implementation, wherein said guaranteed unicast RU allocation cannot be scheduled at the beginning of any R-TWT SP.

The apparatus or method of any preceding implementation, wherein the non-AP STA which is scheduled for any R-TWT can initiate said guaranteed unicast RU allocation during the current ongoing R-TWT SP by exchanging negotiation frames with said scheduling AP.

The apparatus or method of any preceding implementation, wherein upon receiving an acceptance message from said scheduling AP, the non-AP STA can immediately access the guaranteed unicast RU assigned to its AID to transmit in this R-TWT SP.

The apparatus or method of any preceding implementation, wherein said non-AP STA, which is an R-TWT scheduled STA, can contend for a new group association identification (AID) on allocated RA-RU(s) that are designated for non-AP STAs which are not R-TWT members.

The apparatus or method of any preceding implementation, wherein the broadcast TWT recommendation field is set to a specific value to indicate enabling RA-RU access for non-AP STAs that are not R-TWT members.

The apparatus or method of any preceding implementation, wherein contending for a new group association identification (AID) on allocated RA-RU(s) can be scheduled at the beginning of any R-TWT SP.

The apparatus or method of any preceding implementation, wherein said new AID is carried in a beacon frame and broadcast periodically.

The apparatus or method of any preceding implementation, wherein the non-AP STA, which has not obtained membership in a current R-TWT SP, can contend for access to the RA-RU(s) specifically assigned to the new group AID to transmit in this R-TWT SP.

The apparatus or method of any preceding implementation, wherein said non-AP STA, which is a scheduled R-TWT STA can: (A) be assigned a temporary membership of the current ongoing R-TWT SP for one time; (B) be assigned a long-term membership can be torn down at any time.

The apparatus or method of any preceding implementation, wherein said non-AP STA that is a scheduled R-TWT member that is a MLD STA can request to setup different R-TWT agreements on its multiple links.

As used herein, term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these group elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

Relational terms such as first and second, top and bottom, upper and lower, left and right, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential features or elements of the technology describes herein or any or all the claims.

In addition, in the foregoing disclosure various features may be grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after that application is filed. Accordingly, the reader should consult the application as filed for the original content of the disclosure. Any deletion of content of the disclosure should not be construed as a disclaimer, forfeiture or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function"

element unless the element is expressly recited using the phrase "means for". No claim element herein is to be construed as a "step plus function" element unless the element is expressly recited using the phrase "step for".

TABLE 1

AID12 Subfield Encoding

| Subfield | Description |
|---|---|
| 0 | User Info field allocates one or more contiguous RA-RUs for associated STAs |
| 1-2007 | User Info field is addressed to an associated STA whose AID is equal to the value in the AID12 subfield |
| 2008-2044 | Reserved |
| 2045 | User Info field allocates one or more contiguous RA-RUs for unassociated STAs |
| 2046 | Unallocated RU |
| 2047-4094 | Reserved |
| 4095 | Start of Padding field |

What is claimed is:

1. An apparatus for wireless communication in a network, the apparatus comprising:
   (a) a wireless communication circuit, as a wireless station (STA) which is a separate STA or as a STA in a multiple-link device (MLD), and operating as either a regular STA or an Access Point (AP) STA, for wirelessly communicating with other wireless stations (STAs) using a carrier sense multiple access/collision avoidance (CSMA/CA) mechanism on a wireless local area network (WLAN) in which enhanced distributed channel access (EDCA) is utilized for random channel access on all the links;
   (b) a processor coupled to said wireless communication circuit for operating on the WLAN;
   (c) a non-transitory memory storing instructions executable by the processor for communicating with other STAs; and
   (d) wherein said instructions, when executed by the processor, perform steps of a wireless communications protocol for said wireless communication circuit, comprising:
      (i) enqueuing an urgent burst of real-time application (RTA) traffic by a non-AP STA for transmission to the AP during an ongoing restricted target wake time (R-TWT) service period (SP), in which said non-AP R-TWT STA does not have an R-TWT membership;
      (ii) initiating an R-TWT negotiation from said non-AP STA, with the AP for performing scheduling as a scheduling AP, inside the ongoing R-TWT SP, wherein said negotiation contains a request: (A) for either a temporary or a long-term membership in a specific R-TWT SP which is either the current R-TWT SP or an R-TWT SP after the currently ongoing R-TWT SP but before the R-TWT SP that the non-AP STA originally had R-TWT membership for, or (B) for contending for a random access-resource unit (RA-RU) in the current R-TWT SP if the uplink orthogonal frequency division multiple access-based random access (UORA) feature is enabled;
      (iii) wherein said scheduling AP may accept or reject the membership request from the non-AP STA making the membership request, or it may indicate an alternate R-TWT setup or dictate a preferred R-TWT setup from the STA; and
      (iv) wherein in response to the membership request being accepted, said non-AP STA transmits its urgent burst of RTA traffic: (A) in the specific R-TWT SP; or (B) contends for a RA-RU in the current R-TWT SP if UORA is enabled.

2. The apparatus of claim 1, wherein said R-TWT negotiation is based on said non-AP STA transmitting a TWT request frame and receiving a TWT response frame, each of these frames carrying TWT information elements comprising a negotiation type subfield which indicates this form of negotiation.

3. The apparatus of claim 2, wherein said TWT information elements are further comprising a subfield of a request type field for indicating temporary or long-term membership in the current R-TWT, which can be used by said scheduling AP for indicating whether membership is accepted.

4. The apparatus of claim 1, wherein UORA may be enabled in response to setting a value in the broadcast TWT recommendation field to request enabling UORA with at least one RA-RU feature in the R-TWT.

5. The apparatus of claim 1, wherein a non-AP STA which is scheduled for any R-TWT can contend for an RA-RU transmission in the current R-TWT SP if UORA is enabled.

6. The apparatus of claim 1, wherein a non-AP STA which is not scheduled for any R-TWT can contend for an RA-RU transmission in the current R-TWT SP if UORA is enabled.

7. The apparatus of claim 6, wherein upon its OFDMA backoff (OBO) counter reaching a terminal count, a non-AP STA, despite not being an R-TWT member STA can directly send a UL PPDU using one RA-RU or can send a buffer status report (BSR) in the RA-RU to allow said scheduling AP to allocate specific RUs to it for performing directly access in the next triggered UL PPDU transmission.

8. The apparatus of claim 1, wherein the non-AP STA which is an R-TWT scheduled STA requests to join the current R-TWT SP using a guaranteed unicast RU allocated to a specific association identification (AID) owned by it.

9. The apparatus of claim 8, wherein a value of the broadcast TWT recommendation field indicates a request for said guaranteed unicast RU allocation.

10. The apparatus of claim 8, wherein said guaranteed unicast RU allocation cannot be scheduled at the beginning of any R-TWT SP.

11. The apparatus of claim 8, wherein the non-AP STA which is scheduled for any R-TWT can initiate said guaranteed unicast RU allocation during the current ongoing R-TWT SP by exchanging negotiation frames with said scheduling AP.

12. The apparatus of claim 8, wherein upon receiving an acceptance message from said scheduling AP, the non-AP STA can immediately access the guaranteed unicast RU assigned to its AID to transmit in this R-TWT SP.

13. The apparatus of claim 1, wherein said non-AP STA, which is an R-TWT scheduled STA, can contend for a new group association identification (AID) on allocated RA-RU (s) that are designated for non-AP STAs which are not R-TWT members.

14. The apparatus of claim 13, wherein the broadcast TWT recommendation field is set to a specific value to indicate enabling RA-RU access for non-AP STAs that are not R-TWT members.

15. The apparatus of claim 13, wherein contending for a new group association identification (AID) on allocated RA-RU(s) can be scheduled at the beginning of any R-TWT SP.

16. The apparatus of claim 13, wherein said new AID is carried in a beacon frame and broadcast periodically.

17. The apparatus of claim 13, wherein the non-AP STA, which has not obtained membership in a current R-TWT SP, can contend for access to the RA-RU(s) specifically assigned to the new group AID to transmit in this R-TWT SP.

18. The apparatus of claim 1, wherein said non-AP STA, which is a scheduled R-TWT STA can: (A) be assigned a temporary membership of the current ongoing R-TWT SP for one time; (B) be assigned a long-term membership can be torn down at any time.

19. The apparatus of claim 1, wherein said non-AP STA that is a scheduled R-TWT member that is a MLD STA can request to setup different R-TWT agreements on its multiple links.

20. An apparatus for wireless communication in a network, the apparatus comprising:
   (a) a wireless communication circuit, as a wireless station (STA) which is a separate STA or as a STA in a multiple-link device (MLD), and operating as either a regular STA or an Access Point (AP) STA, for wirelessly communicating with other wireless stations (STAs) using a carrier sense multiple access/collision avoidance (CSMA/CA) mechanism on a wireless local area network (WLAN) in which enhanced distributed channel access (EDCA) is utilized for random channel access on all the links;
   (b) a processor coupled to said wireless communication circuit for operating on the WLAN;
   (c) a non-transitory memory storing instructions executable by the processor for communicating with other STAs; and
   (d) wherein said instructions, when executed by the processor, perform steps of a wireless communications protocol for said wireless communication circuit, comprising:
      (i) enqueuing an urgent burst of real-time application (RTA) traffic by a non-AP STA for transmission to the AP during an ongoing restricted target wake time (R-TWT) service period (SP), in which said non-AP R-TWT STA does not have an R-TWT membership;
      (ii) initiating an R-TWT negotiation from said non-AP STA, with the AP for performing scheduling as a scheduling AP, inside the ongoing R-TWT SP, wherein said negotiation contains a request: (A) for either a temporary or a long-term membership in a specific R-TWT SP which is either the current R-TWT SP or an R-TWT SP after the currently ongoing R-TWT SP but before the R-TWT SP that the non-AP STA originally had R-TWT membership for, or (B) for contending for a random access-resource unit (RA-RU) in the current R-TWT SP if the uplink orthogonal frequency division multiple access-based random access (UORA) feature is enabled;
      (iii) wherein said R-TWT negotiation is based on said non-AP STA transmitting a TWT request frame and receiving a TWT response frame, each of these frames carrying TWT information elements comprising a negotiation type subfield which indicates this form of negotiation;
      (iv) wherein said TWT information elements comprise a subfield of a request type field for indicating temporary or long-term membership in the current R-TWT, which can be used by said scheduling AP for indicating whether membership is accepted;
      (v) wherein said scheduling AP may accept or reject the membership request from the non-AP STA making the membership request, or it may indicate an alternate R-TWT setup or dictate a preferred R-TWT setup from the STA;
      (vi) wherein in response to the membership request being accepted, said non-AP STA transmits its urgent burst of RTA traffic: (A) in the specific R-TWT SP; or (B) contends for a RA-RU in the current R-TWT SP if UORA is enabled; and
      (vii) wherein UORA may be enabled in response to setting a value in the broadcast TWT recommendation field to request enabling UORA with at least one RA-RU feature in the R-TWT.

21. A method of performing wireless communication in a network, the method comprising:
   (a) communicating between wireless stations (STAs) that are either separate STAs or STAs within a multiple-link device (MLD), and each of which operates as either an Access Point (AP), or a non-AP STA, for wirelessly communicating with other wireless STAs using a carrier sense multiple access/collision avoidance (CSMA/CA) mechanism on a wireless local area network (WLAN) in which enhanced distributed channel access (EDCA) is utilized for random channel access on all the links;
   (b) enqueuing an urgent burst of real-time application (RTA) traffic by a non-AP STA for transmission to the AP during an ongoing restricted target wake time (R-TWT) service period (SP), in which said non-AP R-TWT STA does not have an R-TWT membership;
   (c) initiating an R-TWT negotiation from said non-AP STA, with the AP for performing scheduling as a scheduling AP, inside the ongoing R-TWT SP, wherein said negotiation contains a request: (A) for either a temporary or a long-term membership in a specific R-TWT SP which is either the current R-TWT SP or an R-TWT SP after the currently ongoing R-TWT SP but before the R-TWT SP that the non-AP STA originally had R-TWT membership for, or (B) for contending for a random access-resource unit (RA-RU) in the current R-TWT SP if the uplink orthogonal frequency division multiple access-based random access (UORA) feature is enabled;
   (d) wherein said scheduling AP may accept or reject the membership request from the non-AP STA making the membership request, or it may indicate an alternate R-TWT setup or dictate a preferred R-TWT setup from the STA; and
   (e) wherein in response to the membership request being accepted, said non-AP STA transmits its urgent burst of RTA traffic: (A) in the specific R-TWT SP; or (B) contends for a RA-RU in the current R-TWT SP if UORA is enabled.

* * * * *